United States Patent [19]

Bieselin et al.

[11] Patent Number: 5,668,863
[45] Date of Patent: Sep. 16, 1997

[54] METHOD AND APPARATUS FOR RECORDING AND RETRIEVAL OF AUDIO CONFERENCES

[75] Inventors: David N. Bieselin, Menlo Park; Glenn A. Eaton, San Jose; Joseph A. McFadden, Palo Alto; Stuart A. Taylor, Menlo Park; Edward D. Tracy, Palo Alto; Emil C. W. Wang, Menlo Park, all of Calif.

[73] Assignee: Latitude Communications, Sunnyvale, Calif.

[21] Appl. No.: 638,196

[22] Filed: Apr. 26, 1996

Related U.S. Application Data

[63] Continuation of Ser. No. 509,390, Jul. 31, 1995, Pat. No. 5,559,875.

[51] Int. Cl.$^6$ .............................. H04M 3/56; H04M 3/50
[52] U.S. Cl. ............................... 379/202; 379/67; 379/88
[58] Field of Search ........................ 379/202, 201, 379/67, 88, 89, 207, 112, 203, 204, 205; 370/260, 261, 262

[56] References Cited

U.S. PATENT DOCUMENTS

| | | | |
|---|---|---|---|
| 4,455,455 | 6/1984 | Little | 379/203 |
| 4,600,814 | 7/1986 | Cunniff et al. | 379/94 |
| 4,656,625 | 4/1987 | Nojiri et al. | 370/62 |
| 4,691,347 | 9/1987 | Stanley et al. | 379/203 |
| 4,796,293 | 1/1989 | Blinken et al. | 379/202 |
| 4,805,205 | 2/1989 | Faye | 379/96 |
| 4,965,819 | 10/1990 | Kannes | 379/53 |
| 4,975,902 | 12/1990 | Damany | 370/62 |
| 5,012,509 | 4/1991 | Nakamura et al. | 379/53 |
| 5,056,136 | 10/1991 | Smith | 380/10 |
| 5,099,510 | 3/1992 | Blinken, Jr. et al. | 379/202 |
| 5,136,581 | 8/1992 | Muehrcke | 370/261 |
| 5,199,062 | 3/1993 | Von Meister et al. | 379/205 |
| 5,257,306 | 10/1993 | Watanabe | 379/53 |
| 5,283,818 | 2/1994 | Klausner et al. | 379/67 |
| 5,323,314 | 6/1994 | Baber et al. | 364/401 |
| 5,323,445 | 6/1994 | Nakatsuka | 348/15 |
| 5,355,403 | 10/1994 | Richardson, Jr. et al. | 379/202 |
| 5,373,549 | 12/1994 | Bales et al. | 379/93 |
| 5,382,972 | 1/1995 | Kannes | 348/15 |
| 5,384,772 | 1/1995 | Marshall | 370/60 |
| 5,408,470 | 4/1995 | Rothrock et al. | 370/62 |
| 5,408,518 | 4/1995 | Yunoki | 379/67 |

(List continued on next page.)

FOREIGN PATENT DOCUMENTS

| | | |
|---|---|---|
| 374 943 A | 6/1990 | European Pat. Off. . |
| 580397-A2 | 1/1994 | European Pat. Off. . |
| 63-261948 | 10/1988 | Japan . |
| 64-32751 | 2/1989 | Japan . |
| 6-98029 | 4/1994 | Japan . |
| 6-177987 | 6/1994 | Japan . |

OTHER PUBLICATIONS

IBM Technical Disclosure Bulletin, "Computer–Mediated Communication System Using Both Telephone And Computer Networks", vol. 30, No. 6, Nov. 1987, pp. 317, 318.

*Primary Examiner*—Krista M. Zele
*Assistant Examiner*—Scott Wolinsky
*Attorney, Agent, or Firm*—Blakely, Sokoloff, Taylor & Zafman

[57] ABSTRACT

An innovative recording and playback system to record and play back audio conferences. In one embodiment, each conference participant's spoken name is recorded and stored in audio files. In addition, the combined voice signals generated by conference participants during the conference are stored in a conference data file. Data links are provided between the spoken names of the conference participants and the combined voice signals recorded during the conference. During playback of the recorded conference, a user can enter a command to an input device to playback the spoken names of the conference participants. In other embodiments, other conference information is stored in audio files and linked to the conference data file such that the information can be retrieved and audibly played back to the user.

32 Claims, 28 Drawing Sheets

U.S. PATENT DOCUMENTS

| | | | |
|---|---|---|---|
| 5,408,526 | 4/1995 | McFarland et al. | 379/202 |
| 5,434,910 | 7/1995 | Johnson et al. | 379/89 |
| 5,434,913 | 7/1995 | Tung et al. | 379/202 |
| 5,438,357 | 8/1995 | McNelley | 348/15 |
| 5,440,624 | 8/1995 | Schoof, II | 379/202 |
| 5,444,476 | 8/1995 | Conway | 348/15 |
| 5,446,491 | 8/1995 | Shibata et al. | 348/15 |
| 5,450,123 | 9/1995 | Smith | 348/17 |
| 5,450,481 | 9/1995 | Penzias | 379/202 |
| 5,452,299 | 9/1995 | Thessin et al. | 370/62 |
| 5,453,780 | 9/1995 | Chen et al. | 348/15 |
| 5,471,318 | 11/1995 | Ahuja et al. | 358/400 |
| 5,473,367 | 12/1995 | Bales et al. | 348/16 |
| 5,475,747 | 12/1995 | Bales et al. | 379/201 |
| 5,477,546 | 12/1995 | Shibata et al. | 370/62 |
| 5,483,587 | 1/1996 | Hogan et al. | 379/202 |
| 5,483,588 | 1/1996 | Eaton et al. | 379/202 |
| 5,491,743 | 2/1996 | Shiio et al. | 379/202 |
| 5,495,522 | 2/1996 | Allen et al. | 379/202 |
| 5,500,671 | 3/1996 | Andersson et al. | 348/15 |
| 5,506,832 | 4/1996 | Arshi et al. | 370/13 |
| 5,509,009 | 4/1996 | Laycock et al. | 370/62 |
| 5,511,111 | 4/1996 | Serbetucioglu et al. | 379/67 |
| 5,524,140 | 6/1996 | Klausner et al. | 379/67 |
| 5,528,670 | 6/1996 | Elliot et al. | 379/204 |
| 5,533,102 | 7/1996 | Robinson et al. | 379/202 |
| 5,533,103 | 7/1996 | Peavey et al. | 379/67 |
| 5,535,256 | 7/1996 | Maloney et al. | 379/112 |
| 5,535,261 | 7/1996 | Brown et al. | 379/67 |
| 5,539,808 | 7/1996 | Inniss et al. | 379/67 |
| 5,553,121 | 9/1996 | Martin et al. | 379/67 |

FIG. 2A

205 — Audio Data File Header Record--*One per audio data file*

Control block.......................... *index to first audio data file control block*
    File length.............................. *number of seconds of audio recording*

210 — Audio Data File Control Block--*One or more per audio data file*

Next ...................................... *index to the next audio data file control block*
    Audio data ............................. *index to audio data block*
    Bookmark .............................. *integer*
    Number of speakers .............. *integer*
    Speakers[] ............................. *vector of participant record indices*
    Entries[] ................................. *vector of participant record indices*
    Departures[] .......................... *vector of participant record indices*

215 — Audio Data Block--*One per audio data file control block*

Size ....................................... *integer size of data*
    Data[] .................................... *vector of digital audio data (4 seconds duration)*

220 — Meeting Record--*One per meeting*

221 — Meeting ID ......................... *key; non-unique number assigned by scheduler*
    222 — Scheduled time/date ........... *key; time & date of scheduled start of meeting*
    223 — Scheduler ............................ *key; index to a user profile (scheduler of meeting)*
    Meeting name........................ *character string*
    Audio name........................... *index to audio data file header record*
    Audio agenda ........................ *index to audio data file header record*
    Audio announcement............. *index to audio data file header record*
    224 — Audio meeting recording........ *index to audio data file header record*
    Scheduled length................... *scheduled length of meeting (minutes)*
    Number of participants .......... *integer*
    Posted? ................................. *yes/no; can others hear recording?*
    Who can listen?..................... *who hears recordings? (anyone/participants only)*
    Recording purge data............ *date when audio meeting recording will be deleted*
    Participants[]......................... *vector of participant record indices*

FIG. 2B

225 — Participant Record--*One or more per meeting*

Meeting index ........................ *identifier of associated meeting record*
226 — User index ........................... *key; identifier of associated user profile (if known)*
        Port ........................................ *audio port used during the meeting*
        Audio name ........................... *index to audio data file header record*
        Speaker? ................................ *yes/no (participant allowed to speak)*
        Next ....................................... *index to next participant record*

230 — User Profile Record--*One per identified system user*

Name ..................................... *key; character string*
        User ID ................................. *key; string of numbers; must be unique*
        Audio name ........................... *index to audio data file header record*
        Password .............................. *string of numbers*
        Phone number ....................... *string of numbers; user's phone number*

Note: A record can be found in the database by the value of any field marked as a *key*.
Any record can also be accessed directly according to its location in the database (index).

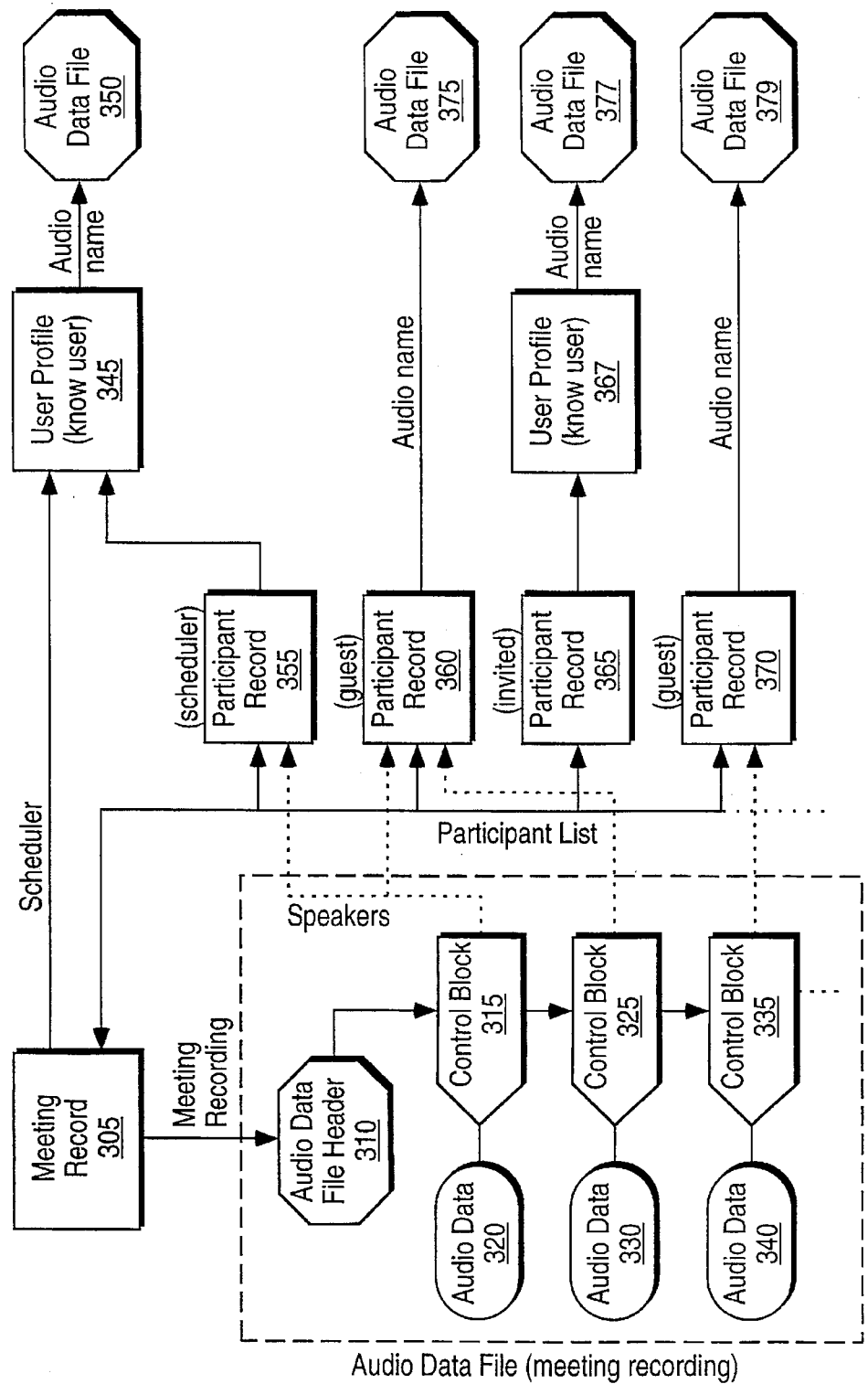

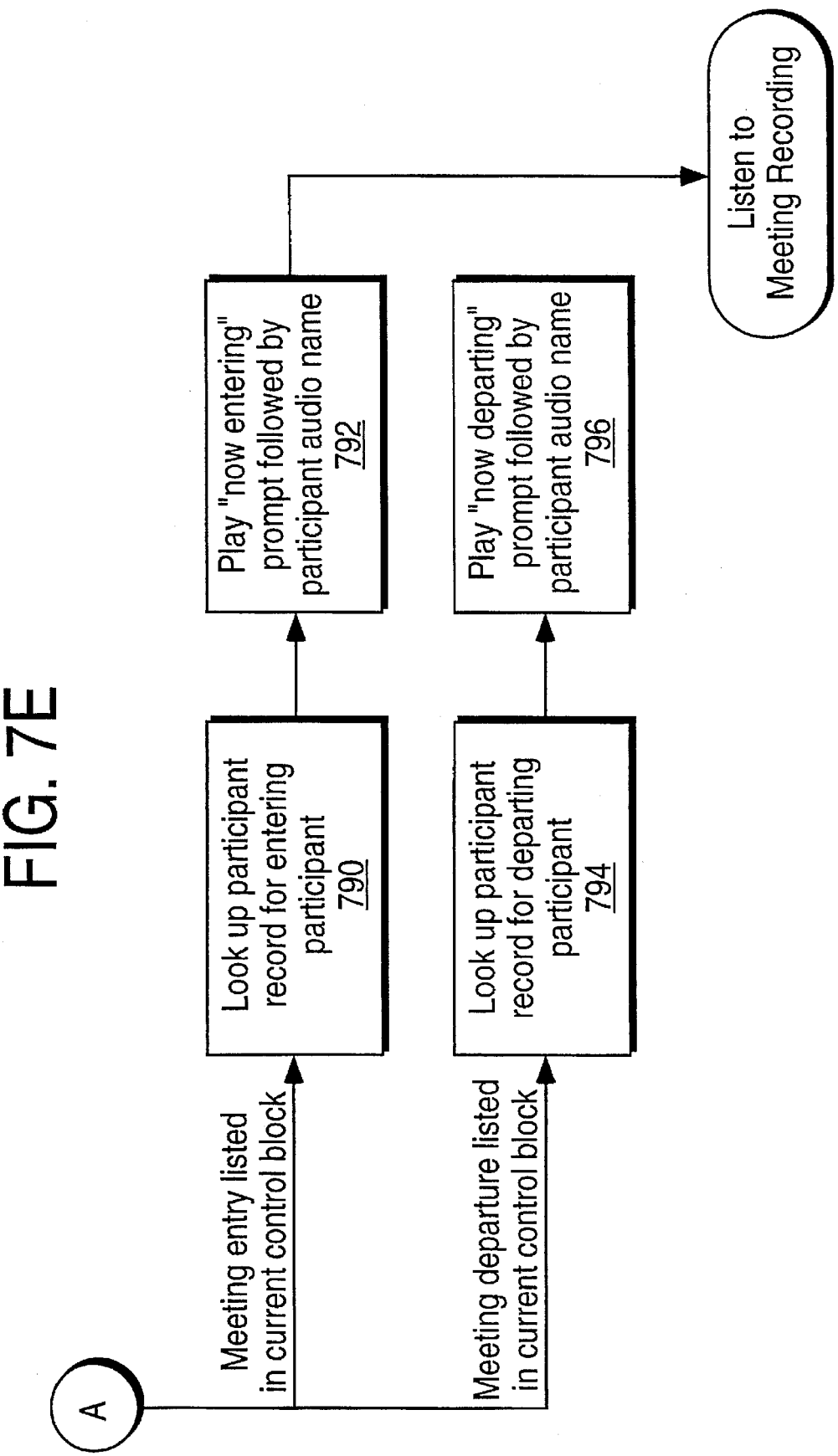

METHOD AND APPARATUS FOR RECORDING AND RETRIEVAL OF AUDIO CONFERENCES

CROSS REFERENCE TO RELATED APPLICATIONS

This application is related to U.S. patent application Ser. No. 08/363,720, entitled "Voice Processing Interface For a Teleconference System", issued on Jan. 9, 1996 as U.S. Pat. No. 5,483,588 to Eaton et al.

This application is a continuation of U.S. patent application Ser. No. 08/509,390 filed Jul. 31, 1995 issued on Sep. 24, 1996 as U.S. Pat. No. 5,559,875 to Bieselin et al.

FIELD OF THE INVENTION

The present invention pertains to the field of teleconferencing systems. More particularly, the present invention relates to recording and playback of audio conferences.

BACKGROUND OF THE INVENTION

Often, large manufacturers having multiple plant locations must conduct design team meetings to coordinate the efforts of engineers and designers scattered amongst the different sites. Sometimes, staff meetings are necessary for managers overseeing employees at those multiple sites. Additionally, meetings might be required to monitor critical project milestones, synchronize plant operations, preparations of logistics, conduct installation, troubleshooting, etc. The attendees for these meetings might be geographically dispersed. For professional service firms such as investment banking, brokerages, lawyers, and accountants, meetings are frequently held to discuss various matters. Again, the attendees are frequently from different locations.

It is quite expensive for each individual to physically attend the meeting. Airfare, car rental, and hotel accommodations can be quite expensive. Furthermore, the attendees' valuable time is wasted traveling to and from the meeting site. These expenditures are compounded if attendees have to travel great distances or internationally. Moreover, there could be complications in making reservations. Furthermore, setting up and coordinating the meeting and rescheduling it if need be, is a thankless, time-consuming, and tedious task.

One way for minimizing costs, time, and frustration involves teleconferencing. Teleconferencing is the process of conducting a meeting with a group of attendees simultaneously over the telephone. Thereby, each of the attendees can communicate in real-time, without having to actually be there in-person.

SUMMARY OF THE INVENTION

The present invention provides a sophisticated, but easy to use recording and playback mechanism of audio conferences and the like. Additional information associated with the conference is integrally recorded with the recorded conference to provide information regarding the conference. For example, in one embodiment, the spoken names of the participants of the recorded audioconference are stored in conjunction with the stored recording of the conference and are retrieved by the user. Other embodiments enable the user to identify who the speakers are during playback of the conference. Another embodiment enables "bookmarks" to be placed in the recording. These bookmarks enable the user to skip to positions identified by the bookmarks. The information, in addition to the simple playback of a recording, enables the user to manage and utilize the information verbally conveyed during the audio conference recorded.

In one embodiment, the audio recorded during the conference is digitized and placed in audio data blocks of a determined size that corresponds to a predetermined time duration of recording. These blocks are stored on a computer storage medium such as a disk drive. A data structure is maintained consisting of an identification of the number and location of the voice blocks. Also provided in the data structure is the identification and location of blocks of data corresponding to the conference participants as well as the identification of other information associated with the conference. When the conference is to be played back by the user, the data structure and corresponding blocks are accessed to play back the conference as well as selectively provide the additional information, for example, the spoken names of the conference participants, to the user.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2a and 2b compose a table illustrating an exemplary data structure used in one embodiment.

FIG. 3 illustrates the data accessed to provide some of the features of the playback of a recording of an audio conference in accordance with one embodiment of the teachings of the present invention.

FIGS. 7a, 7b, 7c, 7d and 7e are flowcharts describing the steps performed in one embodiment for accessing conference recordings in accordance with the teachings of the present invention.

DETAILED DESCRIPTION

An apparatus and method for the recording and playback of audio conferences (meetings) is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form and process steps are shown in flowcharts in order to avoid unnecessarily obscuring the present invention. Furthermore, it is readily apparent to one skilled in the art that the specific sequences in which menus and menu items are presented and functions are performed are illustrative and it is contemplated that the sequences can be varied and still remain within the spirit and scope of the present invention.

Figure 1:
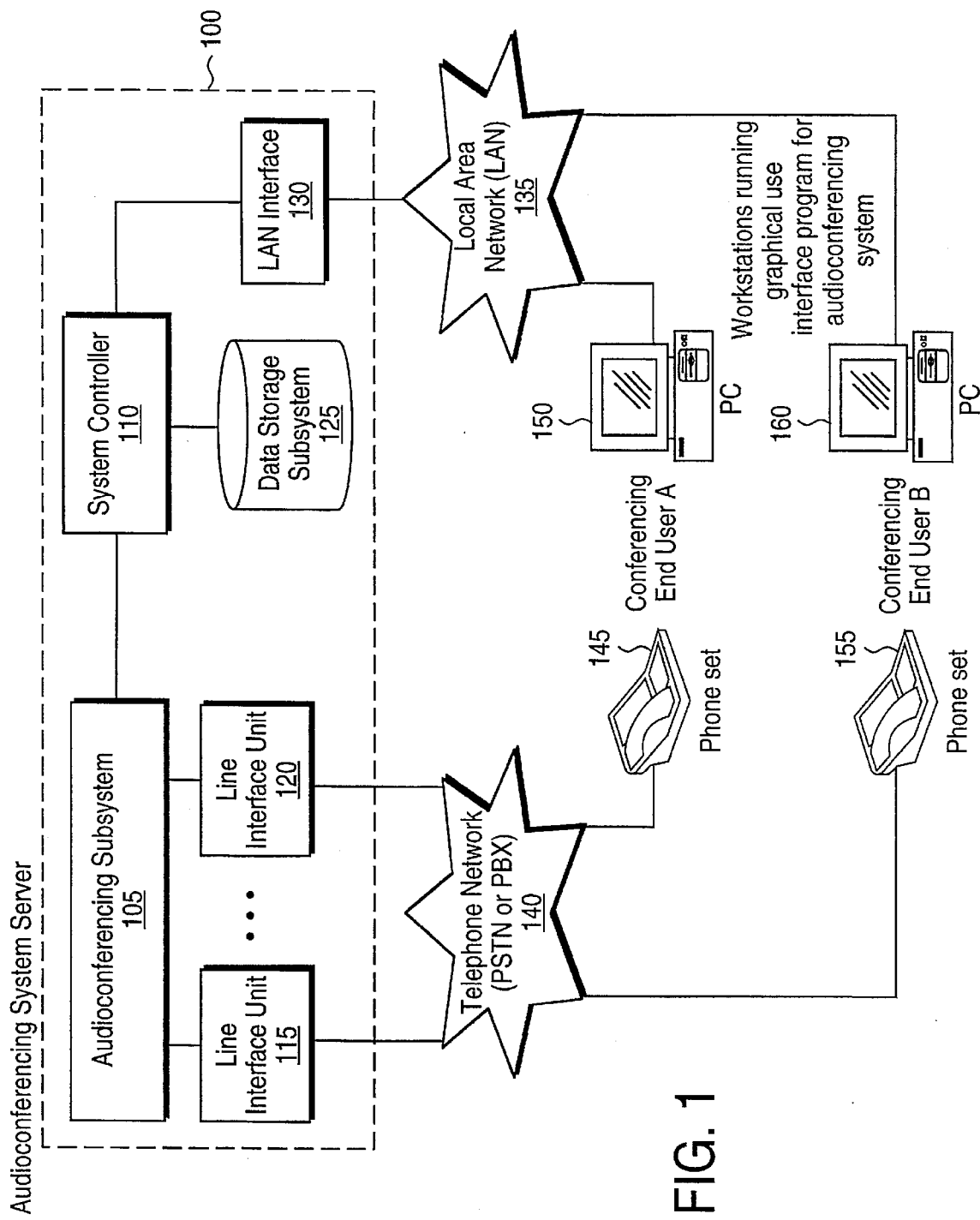
FIG. 1 is a simplified block diagram of an audio conferencing system upon which the present invention may be practiced.

FIG. 1 is an exemplary teleconferencing system which operates in accordance with the teachings of the present invention. FIG. 1 is one embodiment of a system which operates in accordance with the teachings of the present invention. However, it is contemplated that other systems providing similar functionality can be utilized.

Referring to FIG. 1, the system includes a server 100 that is coupled to a telephone network 140, such as a public switch telephone network (PSTN) or a private branch exchange (PBX). Connected to the telephone network are a plurality of phone sets 145, 155. The server 100 is also coupled to a local area network (LAN) 135. The LAN enables the server 100 to interface to one or more user computer systems 150, 160. These computer systems are accessible to a user to perform scheduling and other functions associated with a teleconference. The server 100 includes an audio conferencing subsystem 105 that is coupled to a plurality of line interface units 115, 120. Each line interface unit 115, 120 is programmably coupled to a phone set, for example, phone sets 145, 155, which are used by conference participants to communicate.

The audio conferencing subsystem 105 performs teleconferencing functions that are well known in the art. For example, the audio conferencing subsystem 105 combines or sums voice signals of conference participants received over line interface units 115, 120 and outputs the summed signals through the line card(s) to hand sets of listening conference participants such that each conference participant hears the combined voice signals of the conference participants other than himself.

Controller 110 is a processor that is configured to communicate control signals to audio conferencing subsystem 105, for example, to identify the line cards coupled to phone sets of conference participants. Furthermore, in accordance with the teachings of the present invention, the controller 110 receives the voice signals generated by conference participants during the teleconference and records voice data representative of the voice signals, as well as other information, in the data storage subsystem 125.

To play back a recorded teleconference, controller 110 reads the voice data from data storage subsystem 125 and outputs the voice signals through the audio conferencing subsystem 105 to a particular line interface unit 115, 120, that is coupled to the phone set 145, 155 of the user. In addition, the user, through entry of predetermined dual-tone multifrequency (DTMF) codes, can receive other information regarding the conference in audio form through the hand set, such as a roll call of the conference participants consisting of the spoken name of each conference participant, the spoken name of speakers at a particular point in time and the agenda for the conference.

In an alternate embodiment, information regarding the teleconference recorded is displayed on a personal computer of the user 150, 160, such that the user can select a particular audio conference recording to play back, and furthermore, see information such as a list of the conference participants, the identification of speakers at a particular point in time in the recording and a text version of the agenda for the meeting. This information is generated using data retrieved from the data storage subsystem 125 and output by controller 110 through LAN interface 130, LAN 135 to the computer system 150, 160 of the user.

FIGS. 2a and 2b illustrate exemplary data structures stored in the data storage subsystem (125, FIG. 1). The data structure disclosed provides the necessary data for a telephony based system in which the user listens to the play back of a recorded conference and associated information over his telephone and controls the play back of the conference by entering predetermined DTMF signals using the keypad of his telephone. For a computer-based system, such as the system described with respect to FIGS. 8a–8f, 9a, 9b, 10, 11, 12, 13 and 14, in which the user may listen to the play back of the conference over his telephone, but control the conference through a graphical user interface operating on his computer system, the data structure would include textual fields and/or textual blocks containing textual information regarding attendees, conference agendas, etc.

Referring to FIGS. 2a and 2b, the data structure includes an audio data file 205, audio data file control block 210, audio data block 215, meeting record 220, participant record 225, and user profile record 230. For each meeting, there is a meeting record 220, which includes such information as the meeting ID 221, the scheduled time and date 222, and the identity of the person who has scheduled the conference (the scheduler) 223. In the present embodiment, the meeting ID, scheduled time and date, and scheduler 221, 222, 223, are keyed into the meeting record 220 which permit the user to locate information regarding a particular conference. The meeting record 220 also contains an index, or a pointer, to the audio recording of a conference. In particular, the audio meeting recording entry 224 provides an index to the audio data file control header record 205. The audio data file control header record 205 contains two fields that indicates the length of the recording and a pointer to the first audio data file control block 210.

The audio data file control block 210 provides information associated with a particular audio data block, including a pointer to the audio data block 215 which contains voice data for a portion of the recorded conference. In the present embodiment, each audio data block stores voice data corresponding to approximately 4 seconds of the recording. As will be described below, to play back a recorded conference, the controller 110 retrieves each audio data block 215 in sequence and generates audio from the corresponding audio data retrieved from data storage subsystem 125.

Audio data file headers 205 and audio data blocks 215 are provided for all types of audio data stored in the data storage subsystem 125. For example, at least one audio data file header 205 and audio data block 215 is generated to store the spoken title of the conference, the title of the audio recording, the agenda of the conference, and an optional announcement to the conference when a participant enters a conference.

The meeting record 220 further identifies the participants to the conference, and provides a vector to the participant records 225 for the recorded conference. The participant record 225 provides a user index 226 to the user profile record 230 for each registered participant, and in addition, provides the pointer to the audio data file header record that is associated with the audio data blocks that contain the voice data of the spoken name of the identified participant. The spoken name of the participant is used to generate audio announcements of the entry, departure and speakers during the recorded conference.

Other information is contained in the present embodiment of this data structure as shown in FIGS. 2a and 2b. As will become readily apparent from the description below, this data structure is accessed to retrieve the recording of a particular conference, as well as to provide to the user associated information, such as the roll call consisting of the spoken name of each conference participant of the recorded conference, the identification of particular speakers who are speaking during a time period which spans a particular data block, and a bookmark into a particular audio data block. In addition, the meeting record provides the ability for the user to specify whether the recorded conference is to be posted on a "bulletin board" for all users, for a limited set of users to access, or for access solely by the user who initiated the recording.

FIG. 3 provides a limited example of how information is accessed for certain functions of the system. For example, the meeting record 305 is accessed to locate a particular conference recording, and the audio data file header 310 for that particular conference is accessed to initiate playback of the recording of the conference. The playback consists of accessing a first control block 315 which then enables the system to access the corresponding audio data 320 to play back that audio data to a user over an audio interface, such as the hand set (e.g., handsets 145, 155 FIG. 1), or a sound generator coupled to a computer system. The control block 315 also provides a pointer to the next control block 325 and corresponding audio data 330. Control block 325 similarly provides a pointer to the next control block 335 and audio data 340. The controller accesses the control blocks and audio data sequentially in this manner to generate a play back of the recording of the conference.

Similarly, from the meeting record 305, the system can access the identification of the scheduler by accessing the user profile 345. From the user profile record 345, the spoken name of the scheduler is retrieved from its audio data file 350 and is played back to the user in audible form. In addition, from the user profile record 345, the corresponding meeting records 305 of conferences the user is an identified participant of, are identified, enabling, for example, the generation of a conference list that the user can attend.

Through the meeting record 305, a list of participants can be retrieved, and their spoken names played back to the user. This is accomplished by accessing the meeting record 305 for the participant list. From the list, each participant record 355, 360, 365, 370 is accessed and the corresponding audio data files 375, 377, 379 comprising the spoken name of each conference participant are retrieved and played back as audio. If the participant is a known user in which the user profile is accessible, the participant record 365 provides an index to the user profile 367. If the participant is a guest to the conference, such as a person who calls in to a conference and does not have a user profile, the audio name, that is, the spoken name of the user, will be temporarily stored in the participant record established, and subsequently therefore is available for playback such as when the user subsequently plays back a recorded conference and requests to hear the list of participants to the conference.

Figure 4:
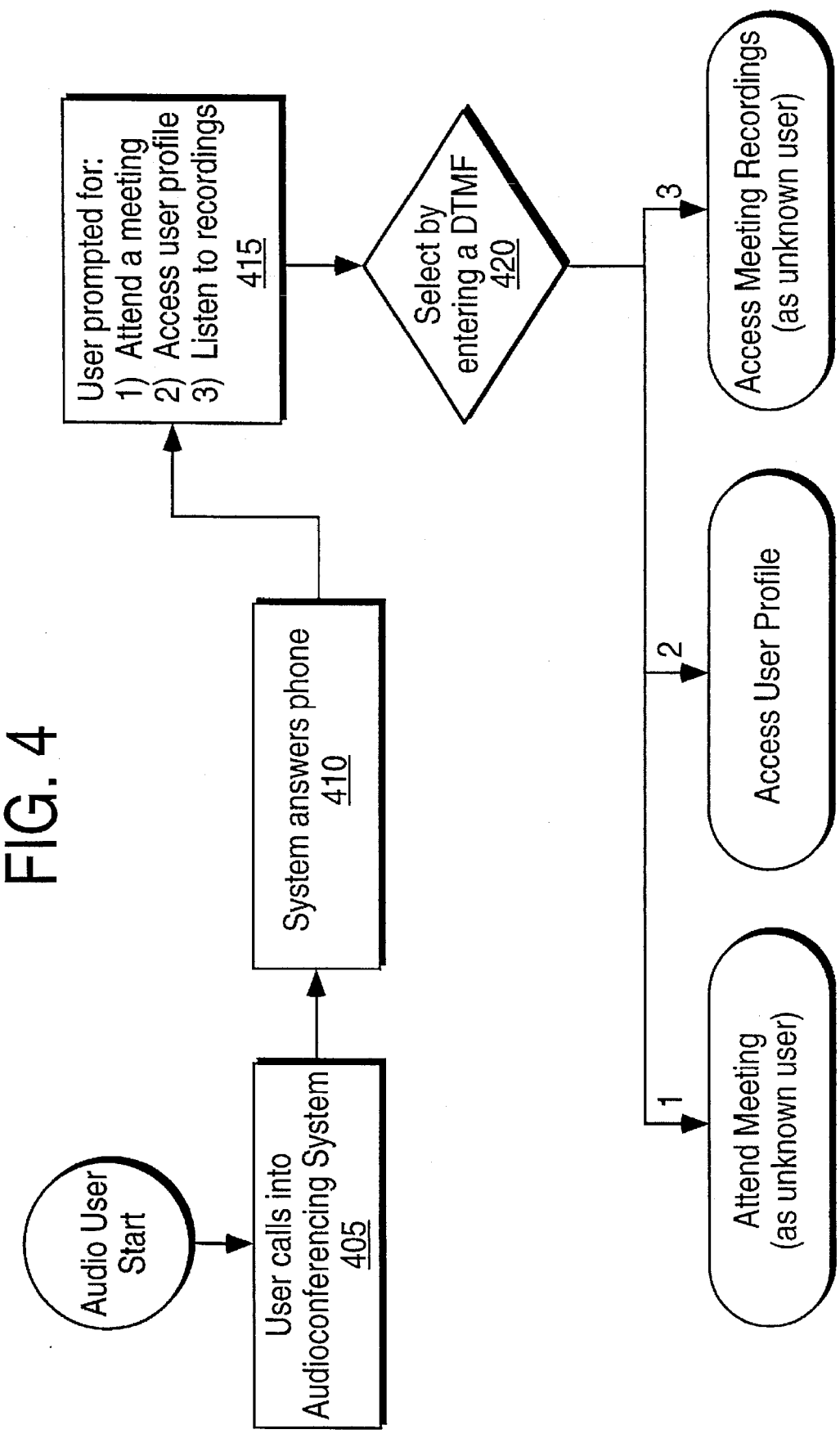
FIG. 4 is a flow diagram illustrating the steps performed in one embodiment to access the system in accordance with the teachings of the present invention.

FIG. 4 is a flow diagram illustrating steps performed by system controller 110 (FIG. 1) in one embodiment of the present invention. The embodiment illustrated in FIG. 4 and the associated following figures are directed to the steps performed to enable a user to interface with a teleconferencing system through a telephone interface. However, as will be described subsequently, the user can also interface to the system through a computer, through the LAN. Referring to FIG. 4, the user calls into the audio conferencing system 405, the system answers the phone 410, and provides the user the opportunity to attend a conference, access the user profile, or listen to recordings of prior conferences 415. The user selects an option 420 by entering in the appropriate DTMF tone by depressing one or more buttons on a touch telephone keypad of the user's phone set.

Figure 5A:
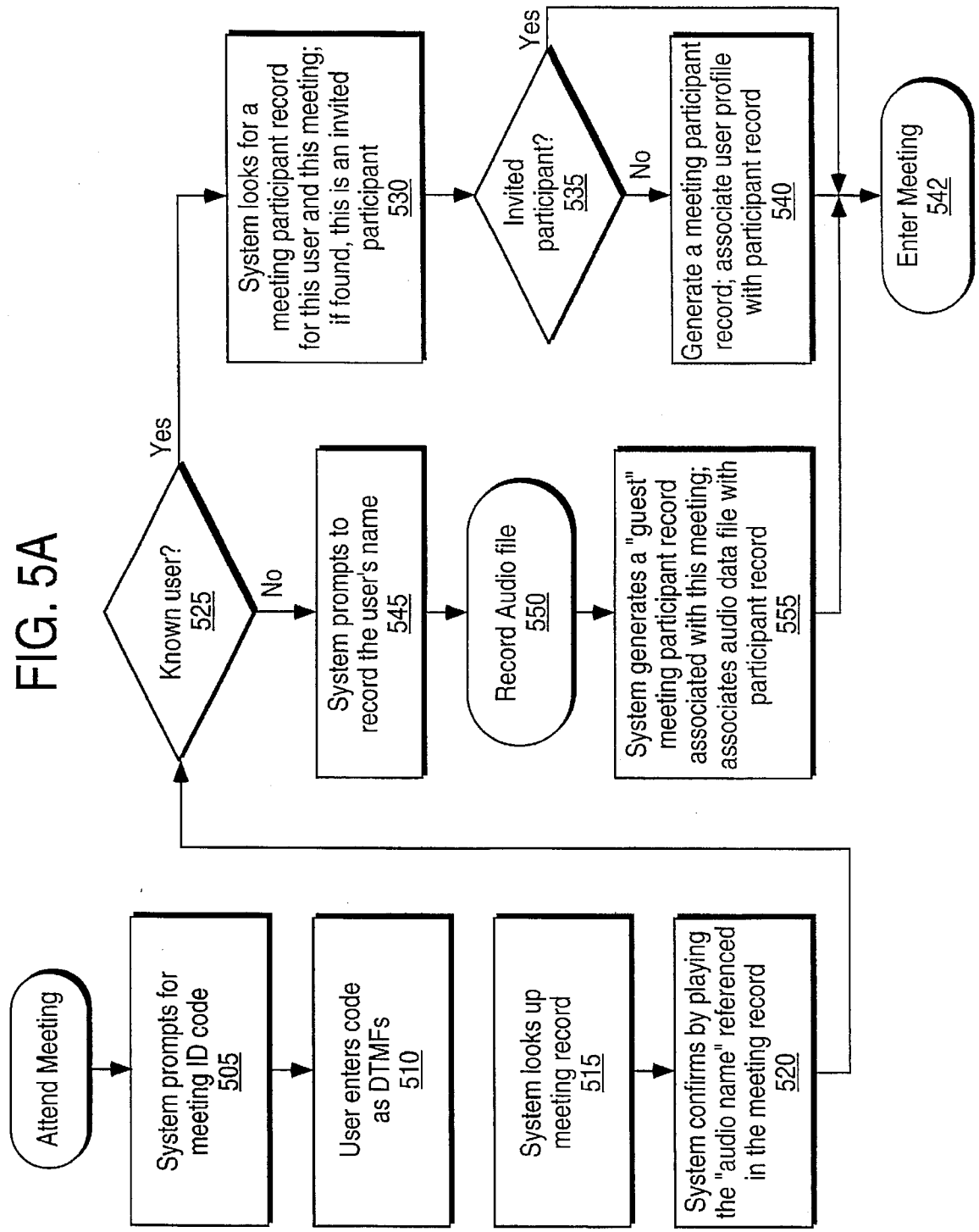
FIGS. 5a, 5b and 5c are flowcharts describing the steps performed in one embodiment to attend a conference or meeting and record a conference in accordance with the teachings of the present invention.

FIG. 5a sets forth steps that occur when a user selects to attend a conference. To attend a conference, the system prompts the user to enter in the meeting ID code previously identified to the user, so that the user can attend the conference 505. The user enters the code 510, the system responds by looking up the meeting record corresponding to the meeting ID code, step 515, and confirms the identification of the conference by accessing the audio data blocks corresponding to the name of the conference, and playing the name of the conference back to the user over the telephone interface, step 520.

If the user is a known or registered user, that is, the user has established a user profile in the system, the system confirms that the user is an invited participant to the conference, steps 525, 530, 535. If the user is invited, step 535, the user enters the conference, step 542. If the user is not invited, at step 540, the system generates a meeting participant record and associates the user profile of the user with the meeting participant record. The user then is able to enter the conference, step 542, and participate in the conference. If the user is not known at step 525, the system prompts the user to speak his name, step 545. The system records the unknown user's spoken name, step 550, and generates a guest meeting participant record associated with the conference. More particularly, the recorded audio file of the spoken name of the guest is associated with a participant record, step 555.

Figure 5B:
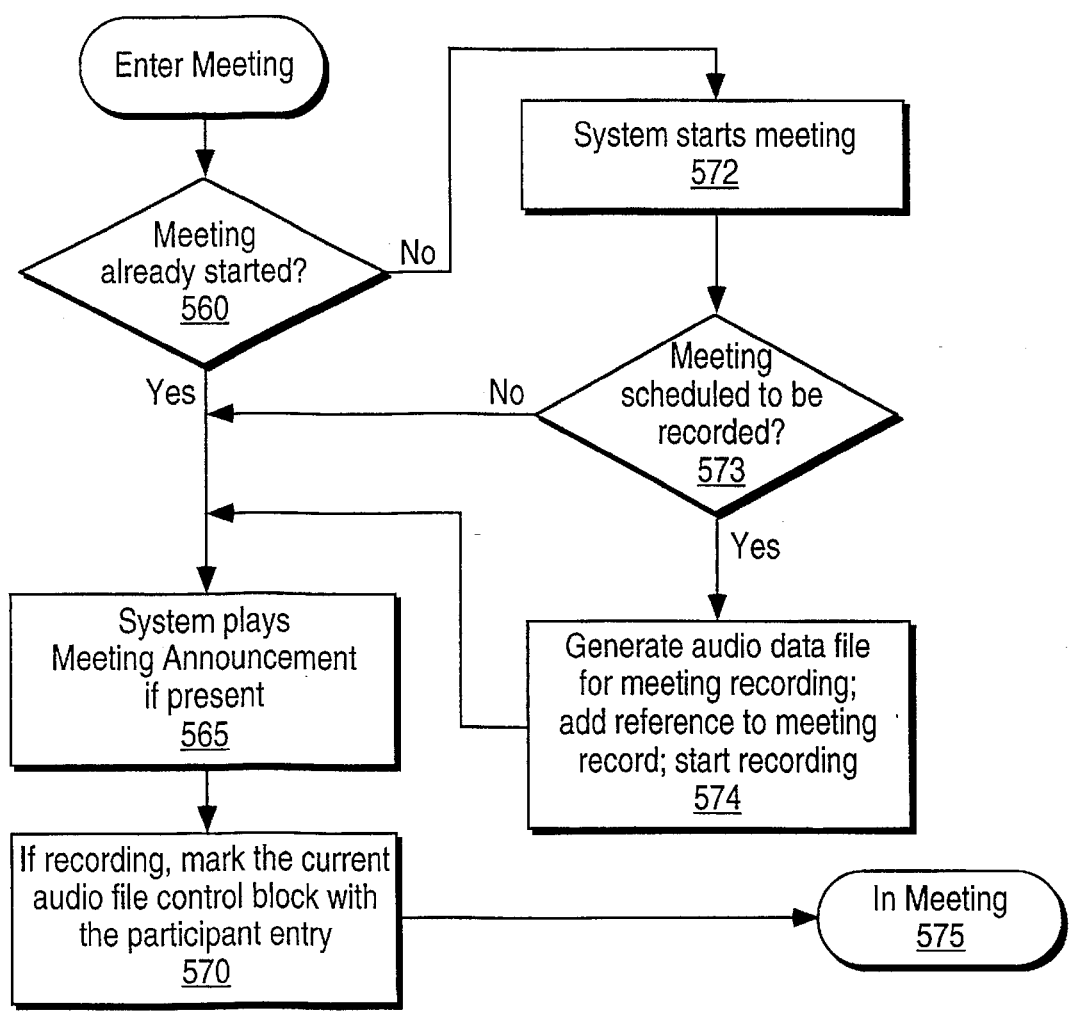

Continuing with reference to FIG. 5b, if the user who called in enters a conference and the conference has already started, step 560, the system plays a conference announcement to the conference participants already present, step 565, to announce that the user has entered the conference and is now a conference participant. In addition, the system provides an indication in the audio file control block for the current audio data file that the user has entered the conference, step 570. This is achieved by updating the entries record of the audio data file control block (210, FIG. 2a).

If at step 560 the conference has not started and the caller that is entering the conference is the first participant, the system initiates the conference, step 572, and if the conference is scheduled to be recorded, step 573, the system responds by initiating the capture of audio and the generation of audio data files to record the conference. Reference to the recording is added to the meeting record and recording is initiated, step 574.

Figure 5C:
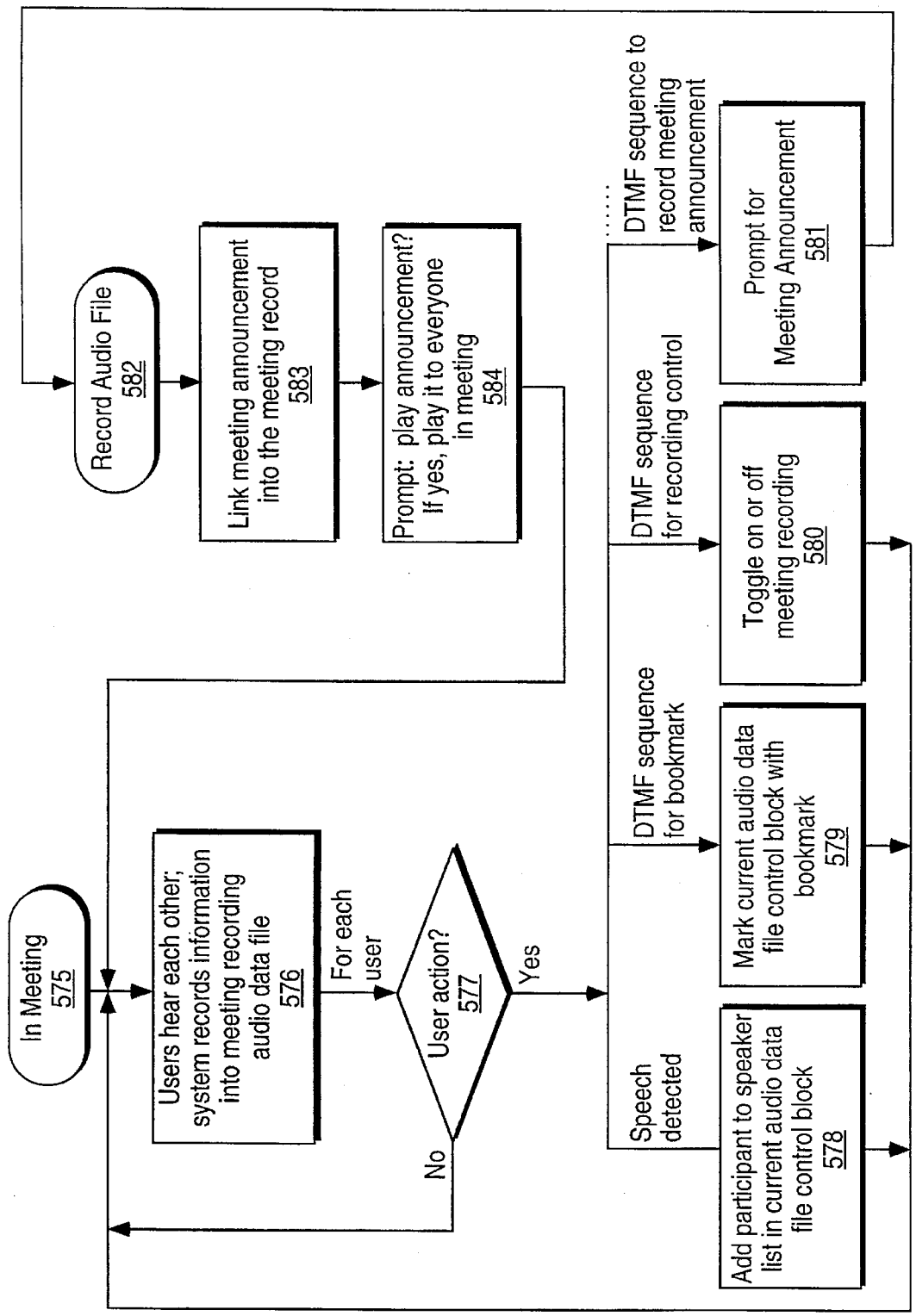

Referring now to FIG. 5c, once in the meeting, step 575, the conference participants are conferenced together in a manner well known in the art, enabling them to speak to each other. The system records the voice data of all of the participants in an audio data file, step 576, preferably in audio data blocks, each approximately 4 seconds in duration.

During the conference, the user can perform certain actions, step 577, to generate information associated with the audio recording of the conference. For example, conference participants who are speaking during a particular audio data block can be identified and added to the speaker list in the current audio data file control block, step 578. When a conference participant speaks, the system detects that a participant has spoken, identifies the source of the speech. This can be achieved a number of ways using technology well known in the art. For example, circuitry can be used to determine voice signals on a particular line card interface; the system can therefore identify the conference participant by the line card or input/output port the conference participant is coupled to. Alternately, speech processing which uses a conference participant's voice print to identify the conference participant speaking may be employed.

In addition, a participant can enter a DTMF code at any time during the conference to provide a bookmark. The system responds to the entry of a DTMF sequence corresponding to placement of a bookmark by marking the current audio data file control block with a bookmark, step 579. The bookmark enables a user who plays back the recorded conference subsequently to skip to the point or points in the conference marked by bookmark(s). In an alternate embodiment, the conference participant can also enter a short audio message to identify the bookmark. For example, if the participant enters the DTMF sequence to mark the point in the conference that a certain topic is discussed, the user may speak an identification of the topic. This is recorded in the current audio data block or in a separate audio data block identified in the audio data file control block for subsequent play back when a user selects to skip to a bookmark during play back of the recorded conference.

A conference participant has the ability to toggle conference recordings on and off as desired using DTMF codes, step 580, to generate non-contiguous recordings or portions of a conference.

The participant can also enter in a DTMF code to record an audio conference announcement. This conference announcement is associated with the conference recording by updating the corresponding entry in the meeting record such that the conference announcement is played prior to the recording of the conference, and is also played to each participant entering the conference, steps 581, 582, 583, 584.

Figure 6B:
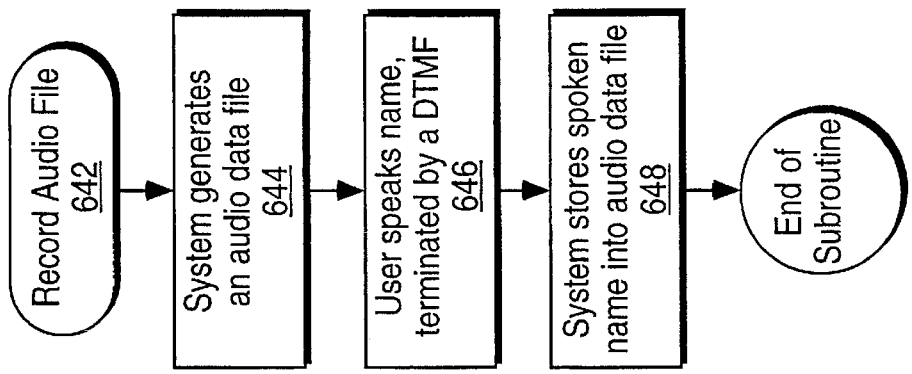
FIGS. 6a, 6b, 6c and 6d are flowcharts describing the steps performed for accessing a user profile and scheduling a conference in accordance with the teachings of the present invention.
Figure 6A:
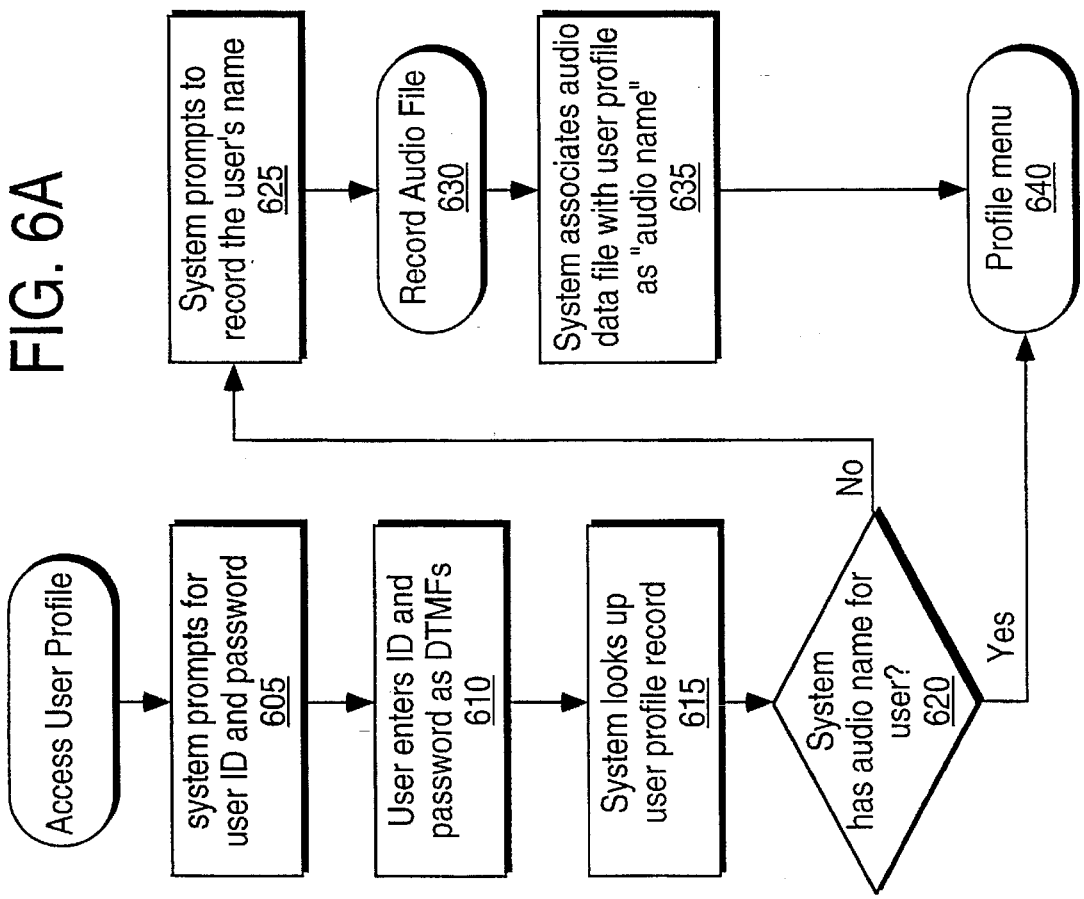
Figure 6C:
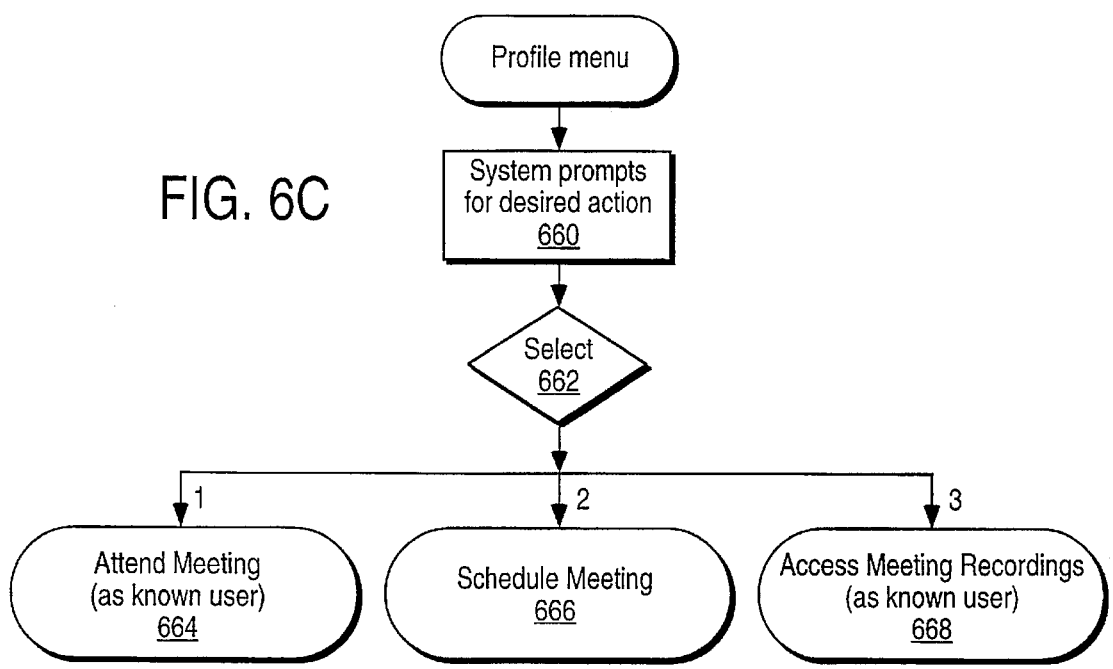

FIGS. 6a, 6b, 6c, 6d set forth exemplary steps performed to access a user profile, record the user's spoken name and associate it with the user's profile, and the options available to a user through the user's profile, including the ability for the user to schedule conferences. Referring first to FIG. 6a, to access the user's profile and the profile menu, the system prompts the user for a user ID and password, step 605. The user enters the user ID and password, preferably using the keypad of a touch-tone telephone, step 610. The system responds by reading the user profile record using the user ID input and confirming authorization using the password, step 615. Associated with each user profile is an audio data file header record and audio data file consisting of the voice data of the spoken name of the user. If the user profile includes an audio data file, step 620, the user is presented the user profile menu, step 640. Thus, at step 620, if a user profile does not include a reference to an associated spoken name, the system will prompt the user to record the user's name, step 625. The user is prompted to speak his name and the system records and stores the spoken name in an audio data file in accordance with the teachings of the present invention, step 630, FIG. 6b, steps 642, 644, 646, 648.

At step 635, the user profile is updated to refer to the audio data file generated and the user is presented the user profile menu, step 640. Once the user is in the user profile menu, the user has access to a profile menu of options, including the ability to attend a conference as a known user, schedule a conference, or access conference recordings, FIG. 6c, steps 660, 662, 664, 666, 668.

Figure 6D:
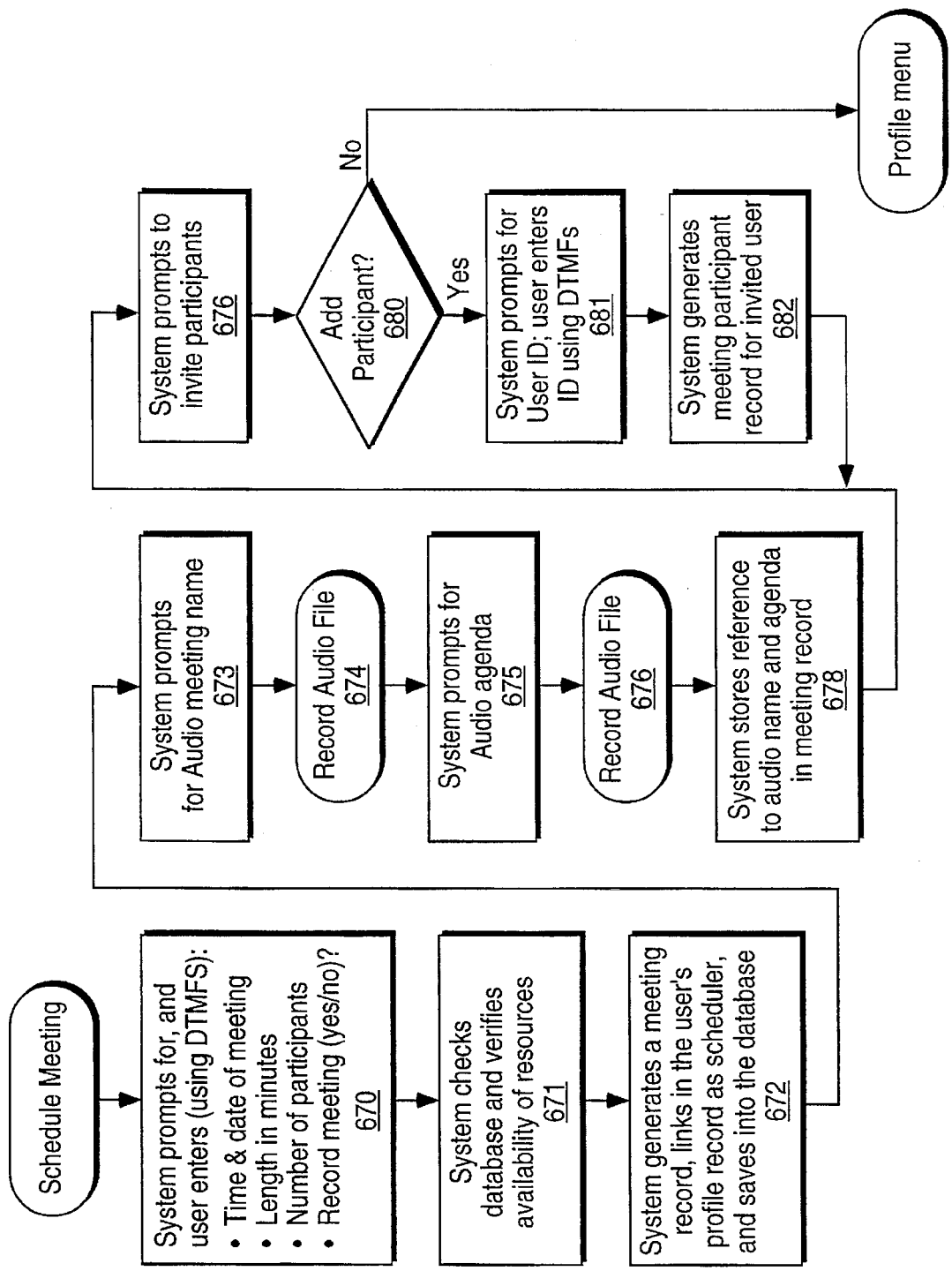

FIG. 6d illustrates exemplary steps performed to schedule a conference. The user is prompted, for example by audio prompts, to enter information needed to schedule the conference. The information entered by the user is stored in the meeting record (steps 670–682). The information entered includes audio data files recorded, for example, the conference name and the agenda, steps 673–678.

Once the conference has taken place, and recorded, a user can access the conference recording. FIGS. 7a, 7b, 7c, 7d, 7e and 7f present steps performed in the present embodiment. In the present embodiment, the conference recordings are accessed through the telephone; however, as is discussed in an alternate embodiment below, the conference recordings can be accessed through the user's computer coupled to the controller through a LAN.

In the present embodiment, the system generates an announcement prompting the user to enter in the meeting ID and the date of the conference. The user utilizes the keypad of the telephone to generate DTMF signals to enter in the information, step 702. The system retrieves the meeting record, step 704, and, if the user is the user that initially scheduled the conference, access to the recording is immediately granted, steps 706, 708. If the user did not schedule the conference, the system then determines whether the user should be granted access to the conference. Steps 710, 712, 714, 716, 718 and 720 set forth exemplary steps to determine if the user should be granted access to the recording. For example, at step 710, if the conference recording is not posted, access to the recording is denied as only the scheduler of the conference has access. If the conference has been posted, access may be granted to any user or limited to participants or identified users, steps 712, 714, 716, 718, 720. If access to the conference recording is denied, a message is generated notifying the user that access is denied and the user is exited from the access conference recordings menu, steps 721, 722.

Figure 7A:
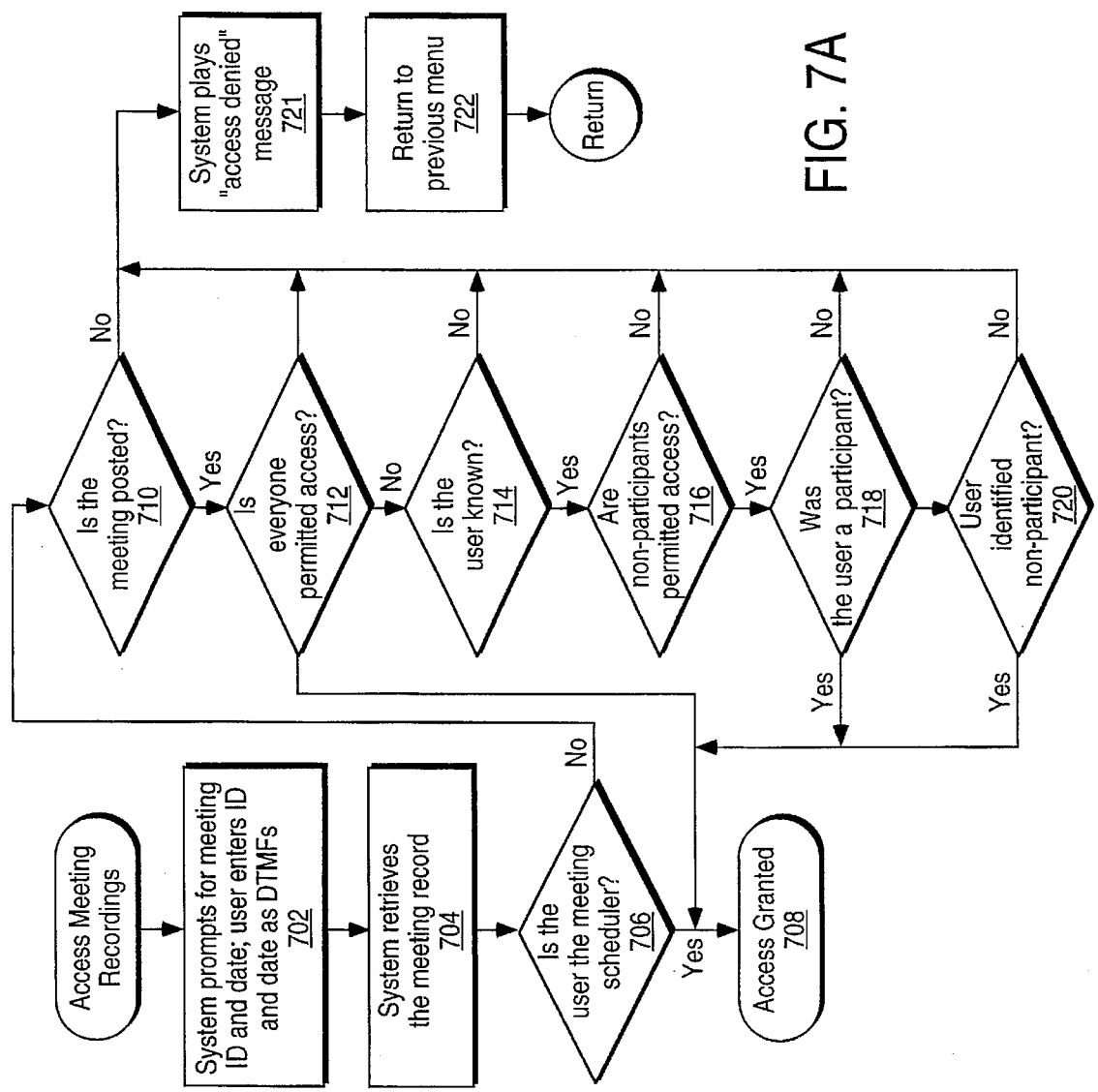
Figure 7B:
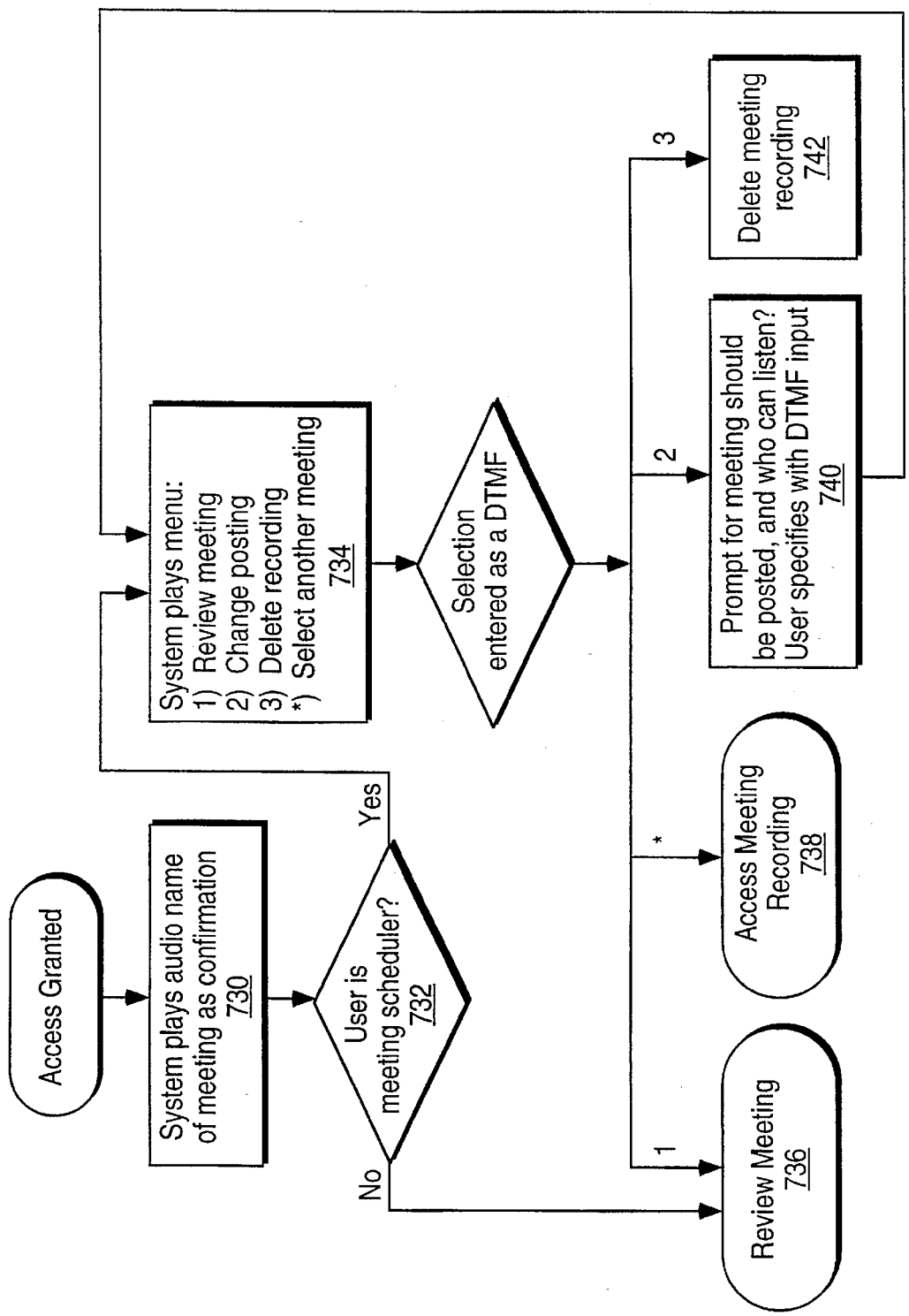

Once access is granted to the recording of the conference, as shown in FIG. 7b, the system replays the spoken name of the meeting as a confirmation to the user that the user has accessed the desired meeting, step 730. If the user scheduled the meeting, step 732, a menu of options is available, step 734, such as reviewing certain information regarding the conference, step 736, returning back to a prior menu, step 738, changing the posting of the conference, step 740, and deleting the recording, step 742. If the user did not schedule the conference, the user only has access to the menu option to review the information regarding the recorded meeting, step 736.

Figure 7C:
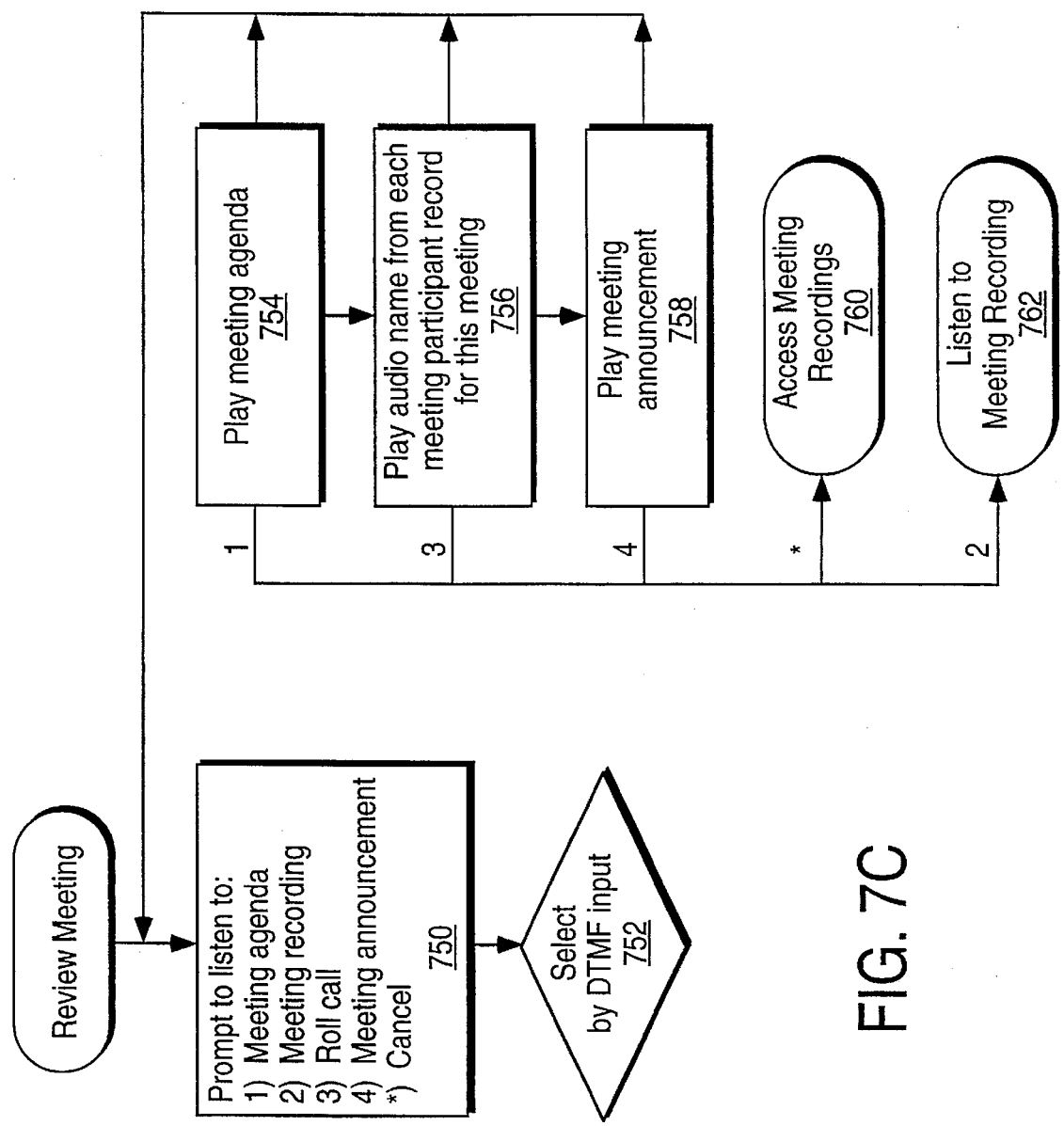

FIG. 7c illustrates examples of steps performed to review conference information of the recorded conference. When the user proceeds to review the conference at step 750, a menu of items are presented to the user, preferably by audio replay to the user. The user selects an option by entering the appropriate DTMF sequence of tones, step 752, to select the play back of the meeting agenda, step 754, play back of the roll call for the conference consisting of the spoken name of each conference participant, step 756, play back of the meeting announcements, step 758, to exit the menu, step 760, and to play back the conference recording, step 762.

Figure 7D:
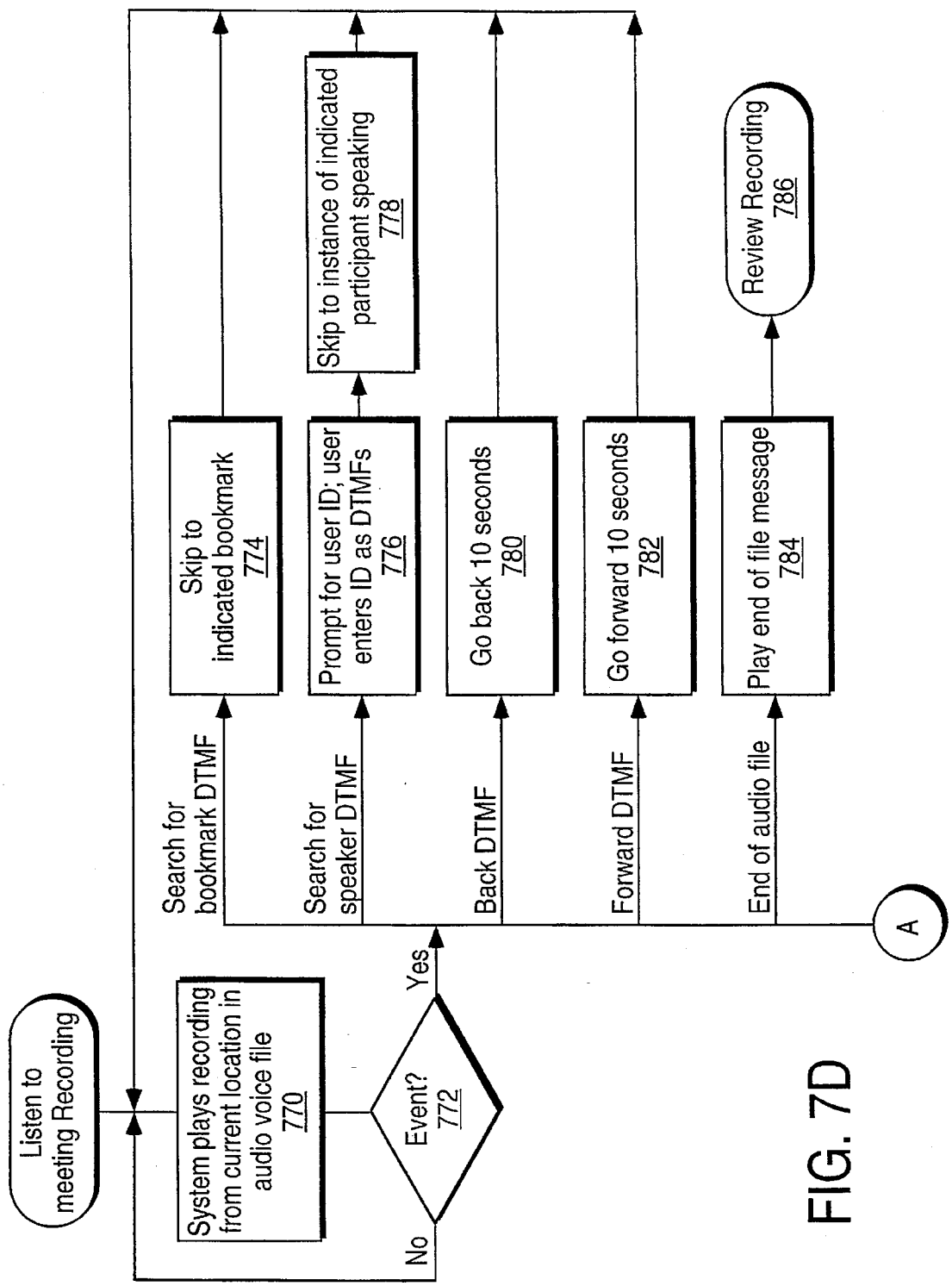

Once the user initiates the playback of a conference recording, as shown in FIG. 7d, a number of options are provided. To play back the conference recording, the system generates audio using the voice data stored in each sequential audio data file, as identified by the audio data file header records and audio data file control block in the data structure stored located on the data storage subsystem.

At step 770, the system plays back the recording and continues to do so until an event is generated. An event is generated when the end of the recording is reached, or the user enters in a DTMF tone indicative of a certain command. Thus, when an event is generated, step 772, the system temporarily stops the playback of the recording and performs the corresponding action. For example, the system can skip to a bookmark location, step 774, and continue playing back the recording of the audio conference from the point of the bookmark. The user can also search for the point in the conference where a particular conference participant is speaking. The system responds by prompting the user for the user ID of the participant after which the system skips to the point in the playback recording where the indicated participant is speaking, steps 776, 778. This can be selectively achieved in the forward and reverse directions. The user playing back the recording can also move back a predetermined amount of time in the recording, step 780, or go ahead a certain amount of time, step 782. Once the end of the audio file is reached, an end of playback message is provided, step 784, and the user is brought back to the review recording menu, step 786 (FIG. 7c).

During playback, other events are possible, such as illustrated in FIG. 7e. For example, if during the actual conference, a conference participant enters the conference, this is noted in the audio data file control block for the audio data file record. Therefore, during playback, if an entry for an entering participant is shown, the system looks up the participant record and regenerates an announcement stating that a participant is entering the conference, followed by the spoken name of the participant, steps 790, 792. A similar occurrence occurs for each participant that leaves a conference, steps 794, 796. Thus, during playback, the user is notified of participants entering and leaving the conference.

The present embodiment describes an audio recording and playback system which enables a user to record audio conferences for playback at a subsequent time. The user controls the recording and playback of the conferences through the keypad on his telephone. However, it also is contemplated that such options are available to the user through a graphical user interface (GUI) operating on a computer system connected through a network, such as a local area network (LAN) to the system controller.

FIGS. 8a, 8b, 8c, 8d, 8e and 8f set forth steps performed by a user, by the system controller and by a graphical user interface program operating on a user's computer system.

Figure 8A:
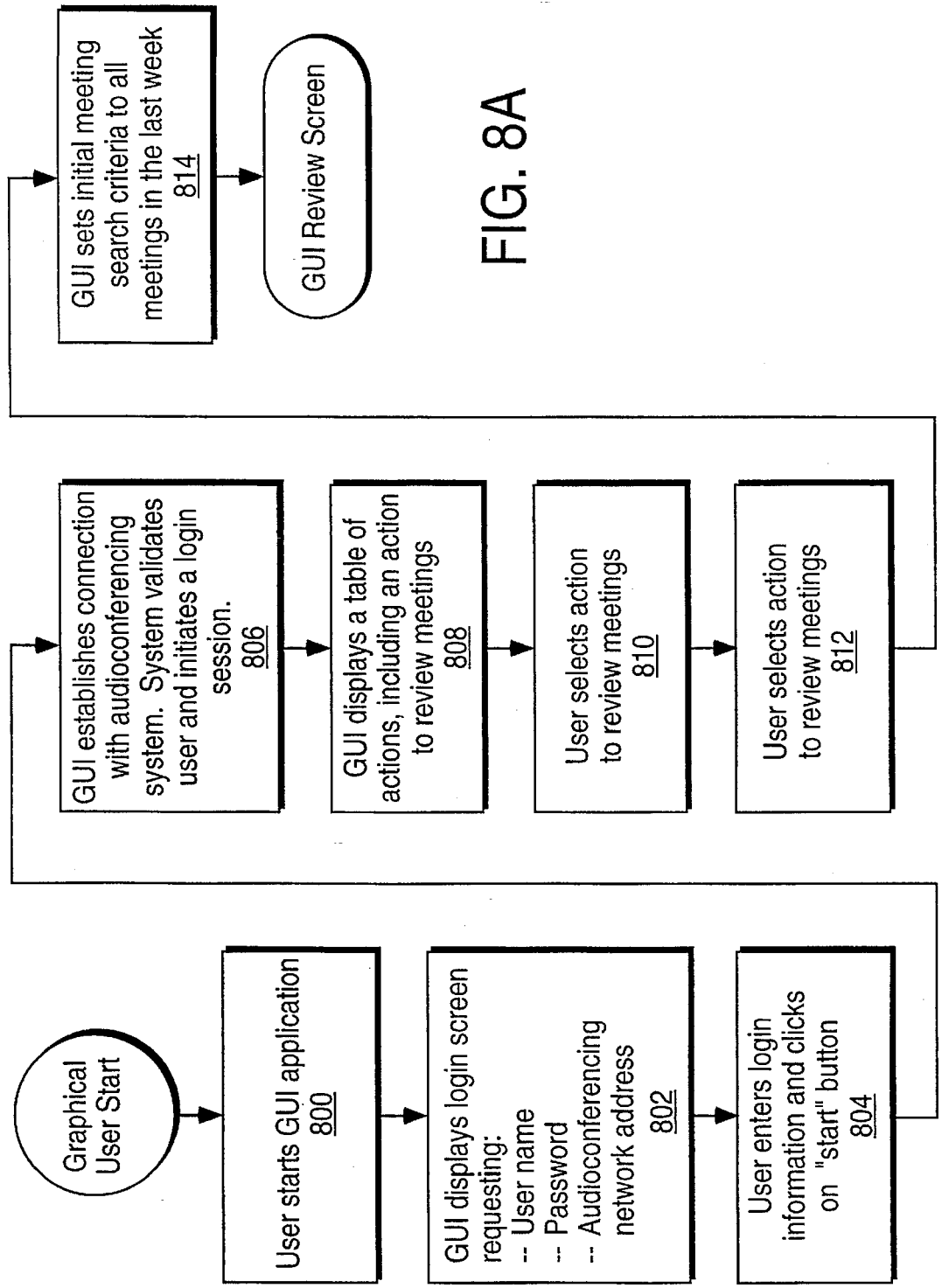
FIGS. 8a, 8b, 8c, 8d, 8e and 8f are flowcharts describing the steps performed by the user, system controller and graphical interface program in one embodiment of the system of the present invention.
Figure 8B:
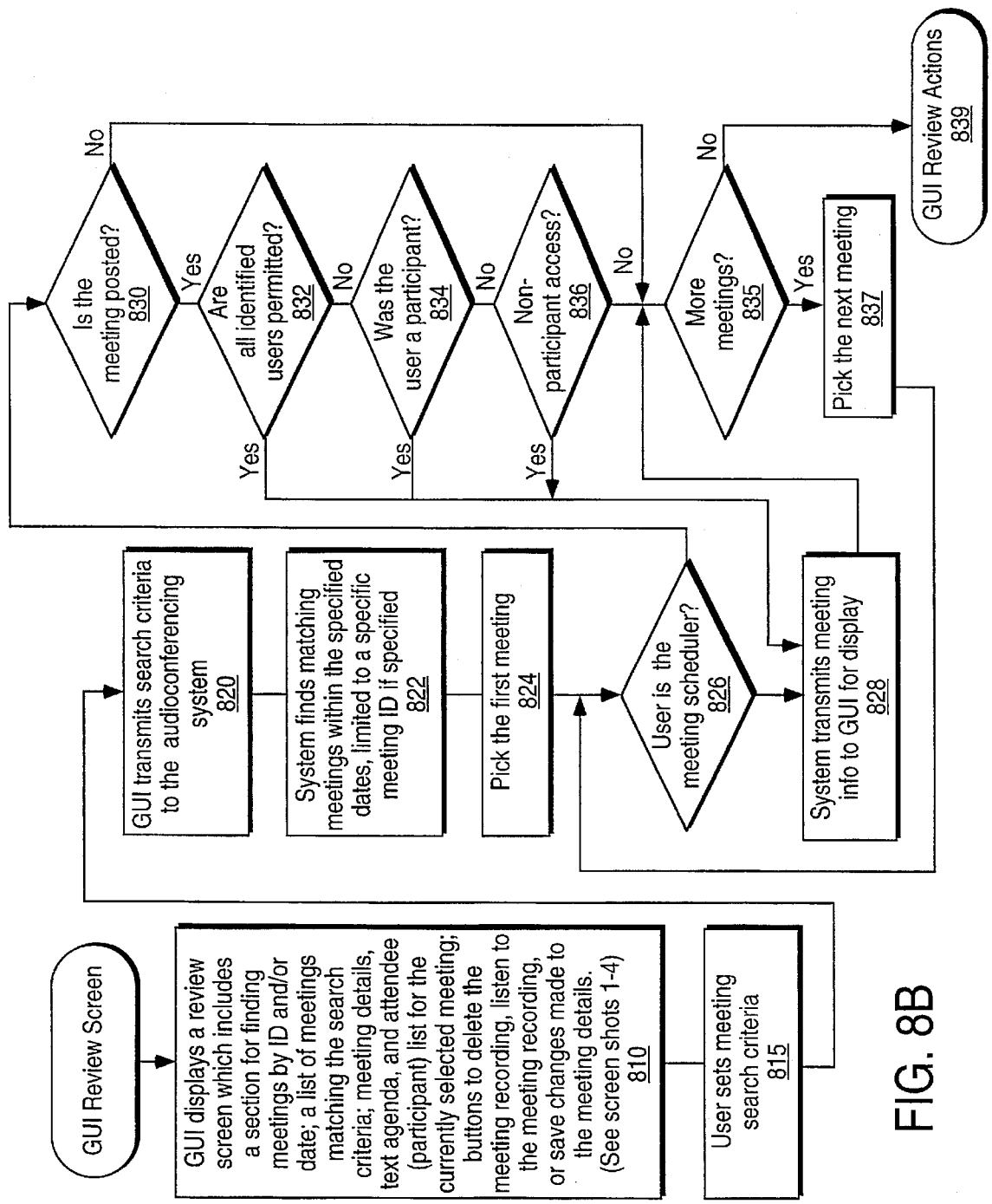

FIG. 8a illustrates the steps performed by a user who accesses to the teleconferencing server through a remote computer, executing the GUI application to interface with the system controller. Thus, the user enters onto the computer log-in information, such as the user name and password. The GUI establishes a connection with the system controller, which then validates the user's access. The system controller, once the user is validated, provides the GUI an indication of access, and the GUI responds by displaying a table of actions available to the user, such as to review meetings. When the user selects to review conferences, the server then retrieves information regarding conferences for display to the user. For example, the server will provide to the graphical user interface program meetings that occurred in the past week, steps 800, 802, 804, 806, 808, 810, 812, 814.

Figure 9A:
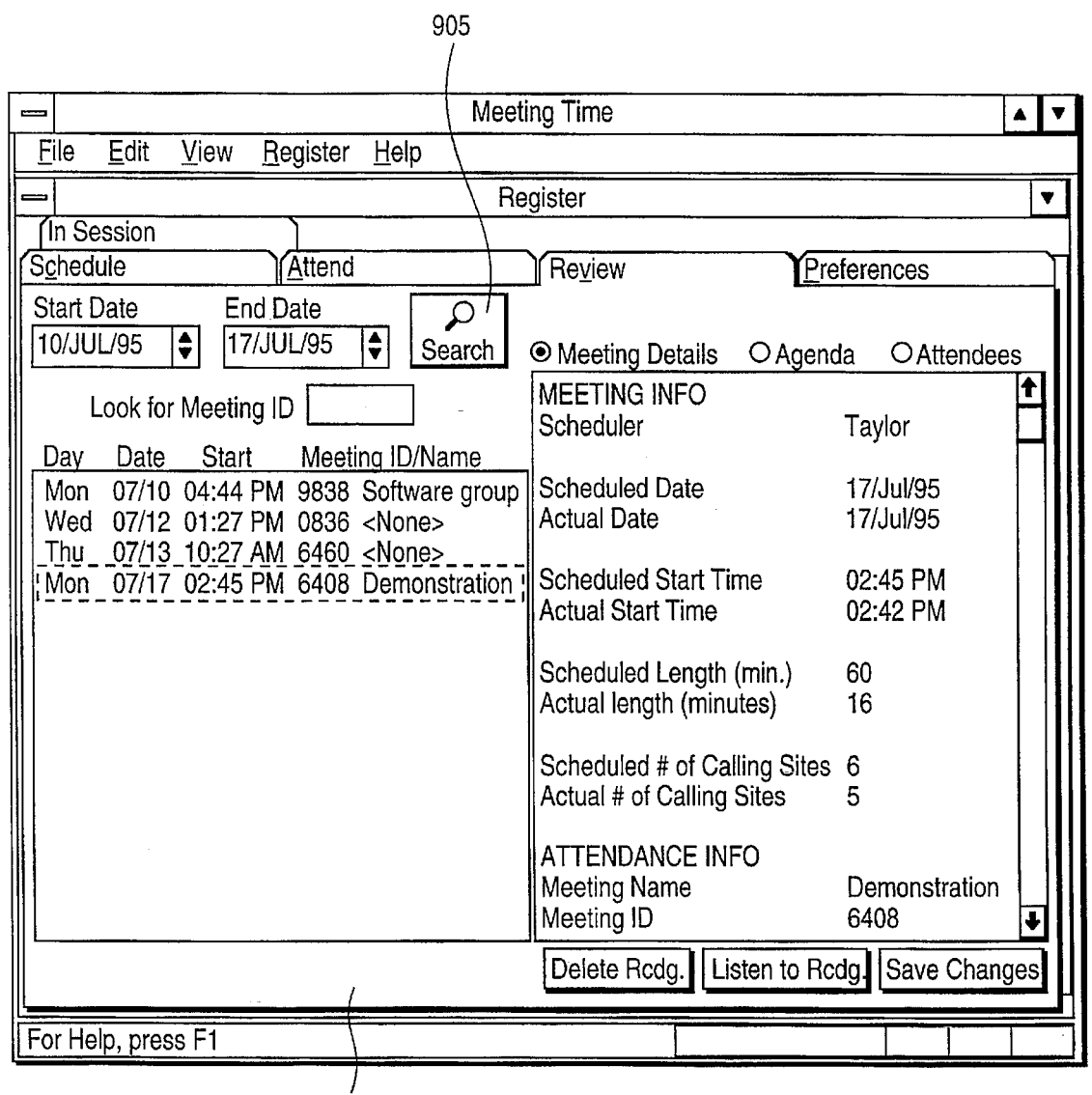
FIGS. 9a and 9b are screen displays showing conference details n one embodiment of the system of the present invention.
Figure 9B:
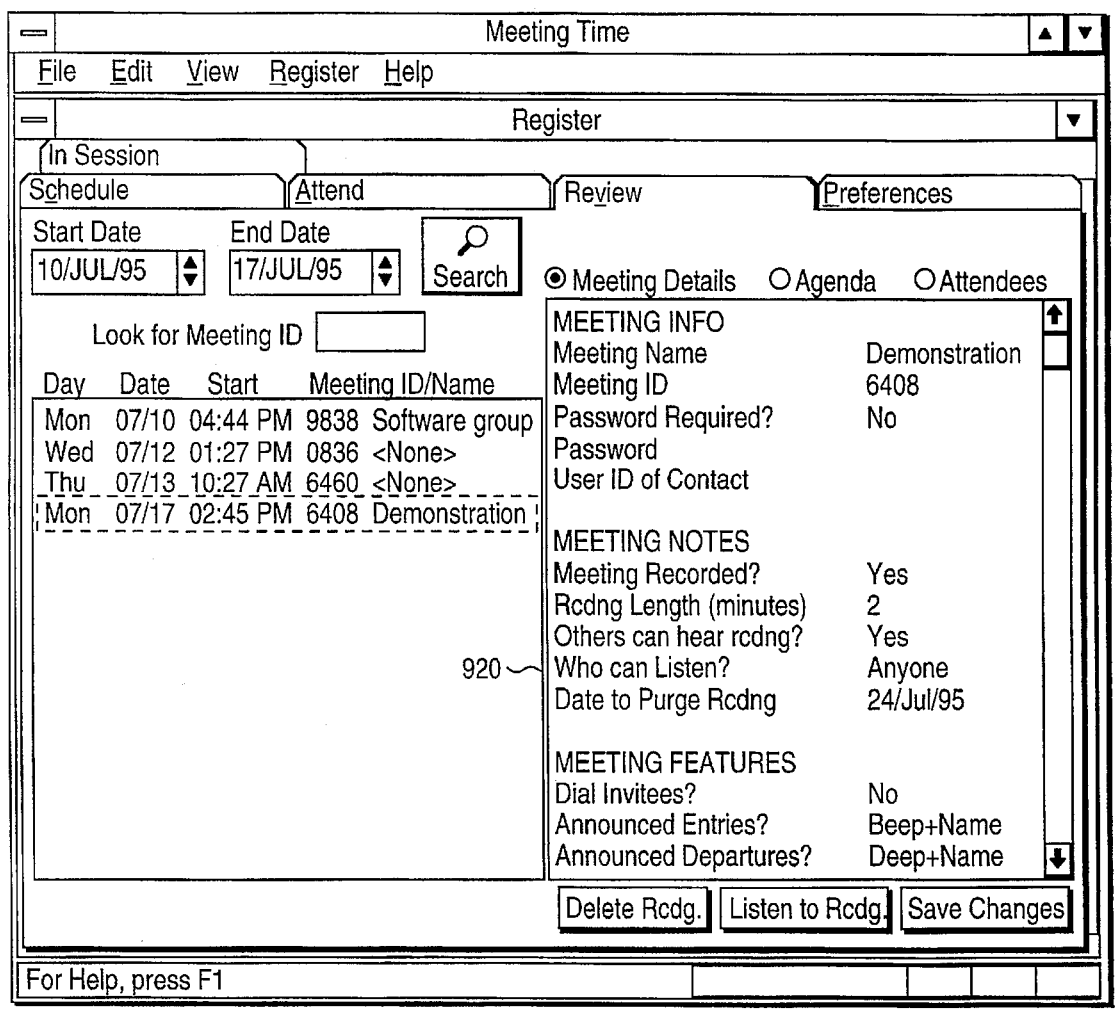

The GUI program then generates, step 816, a review screen, such as that illustrated in FIGS. 9a and 9b. The user can specify specific search criteria for retrieving a particular meeting using the search key shown on the display, step 905. The system responds by updating the list of conferences displayed 910 to comply with the search criteria, steps 818, 820, 822. The user can, with his input device such as a mouse and a cursor on the display, select a particular conference to review, step 824, FIG. 8b.

As noted previously with respect to FIG. 7a, the system will verify whether the user has access to the conference information. For example, if the user scheduled the conference, access is granted to the system by transmitting meeting information to the graphical user interface for display, steps 826, 828. If the user did not schedule the conference, the system determines if the user is to have access using similar criteria discussed previously. In particular, if the meeting was posted, step 830, the system determines whether all identified users are permitted access, step 832, whether the user was a meeting participant, step 834, or whether the user was not a meeting participant, but permitted access, step 836. If the answer to any one of steps 832, 834 or 836 is yes, the user is given access. At steps 835 and 837 it is determined whether additional meetings are to be selected. If there are no additional meetings to review, the GUI review action is presented, step 839 (FIG. 8c).

Figure 10:
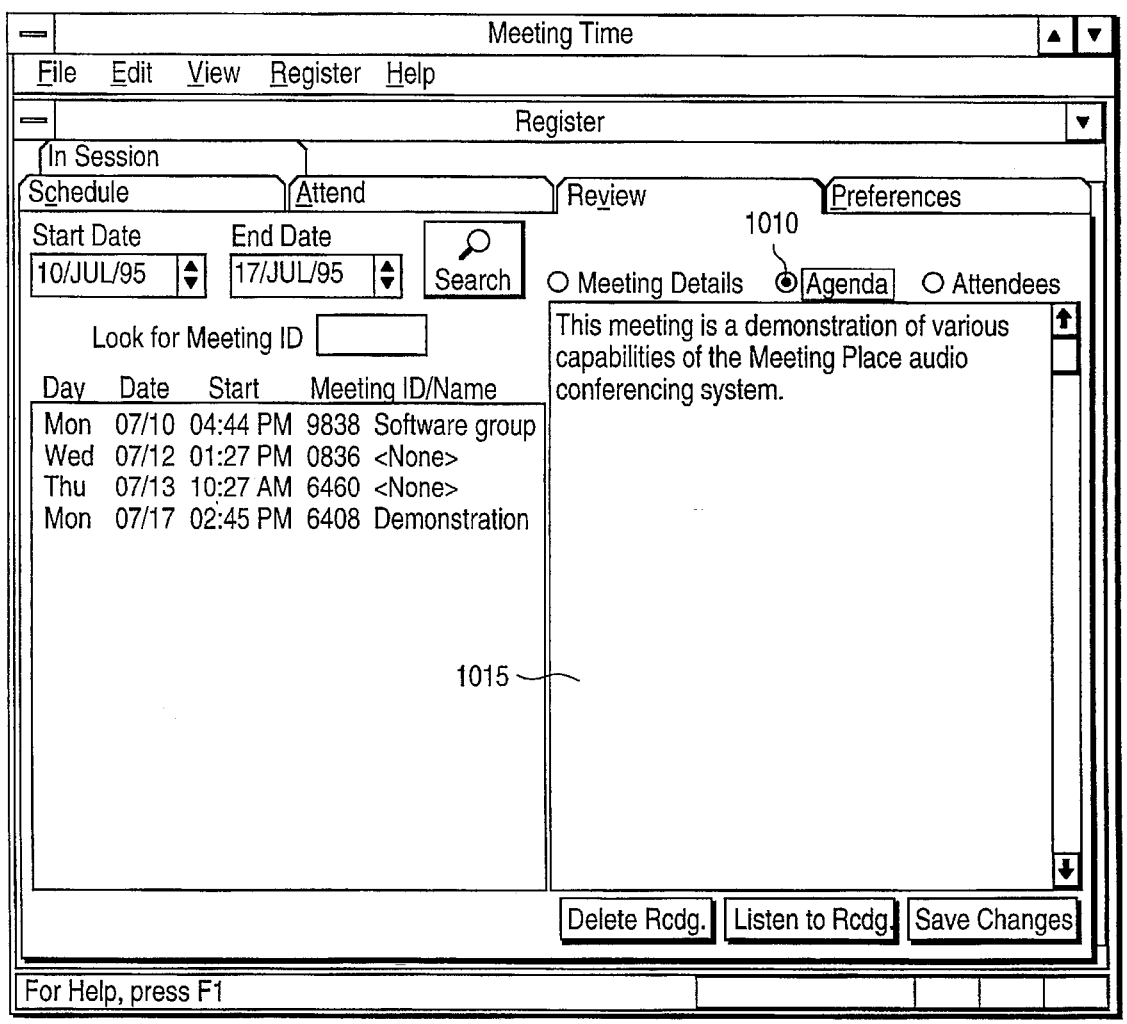
FIG. 10 is a screen display showing the agenda for a selected conference in one embodiment of the system of the present invention.
Figure 11:
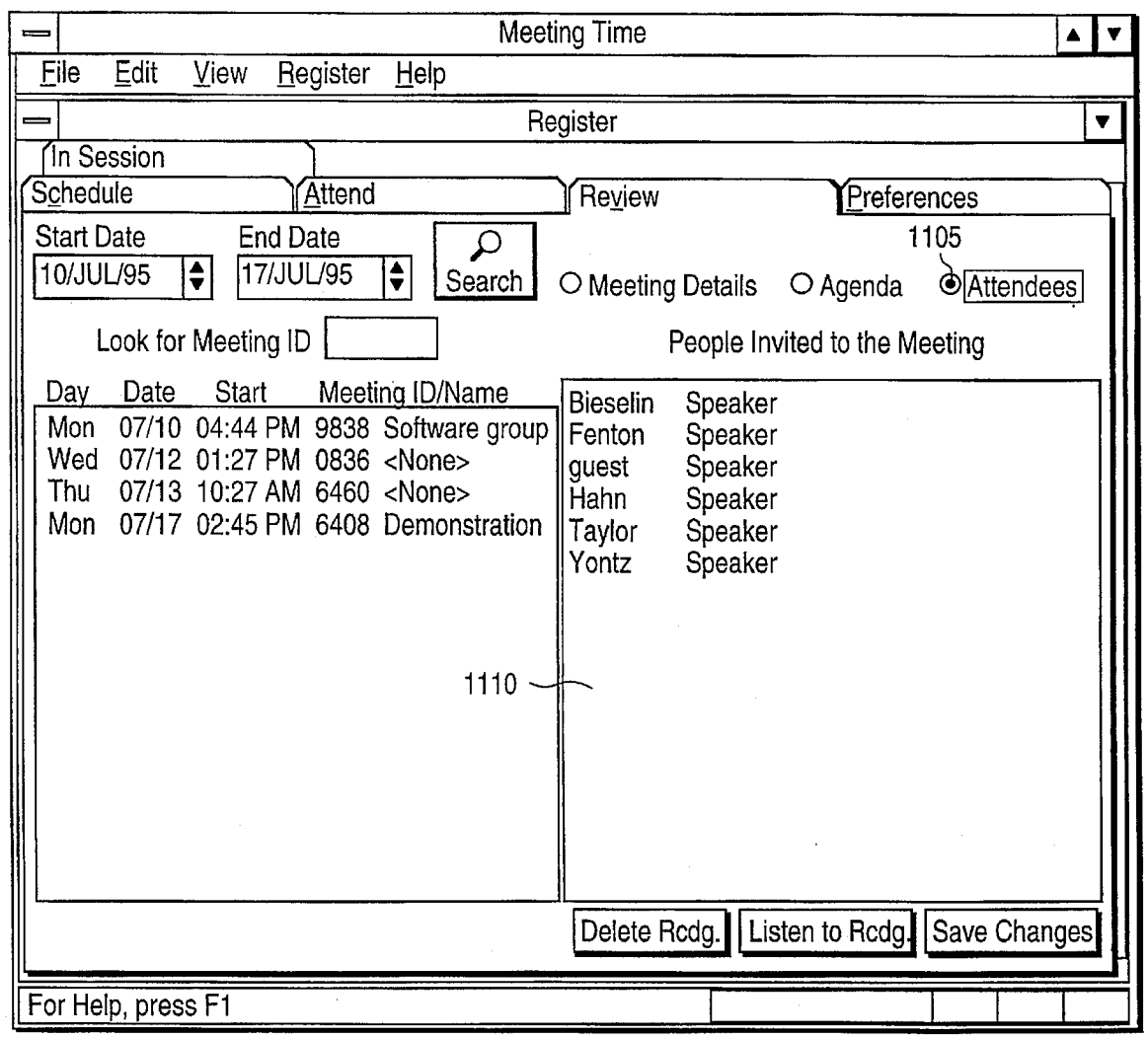
FIG. 11 is a screen display showing the conference attendees of a selected conference in one embodiment of the system of the present invention.

FIGS. 10 and 11 illustrates screen displays generated to provide conference information graphically to the user. By selecting to view the agenda of the meeting, using button 1010, the text agenda 1015 is displayed. Similarly, as shown in FIG. 11, the attendee list 1110 can be viewed by selecting the attendees button 1105 on the display.

Figure 8C:
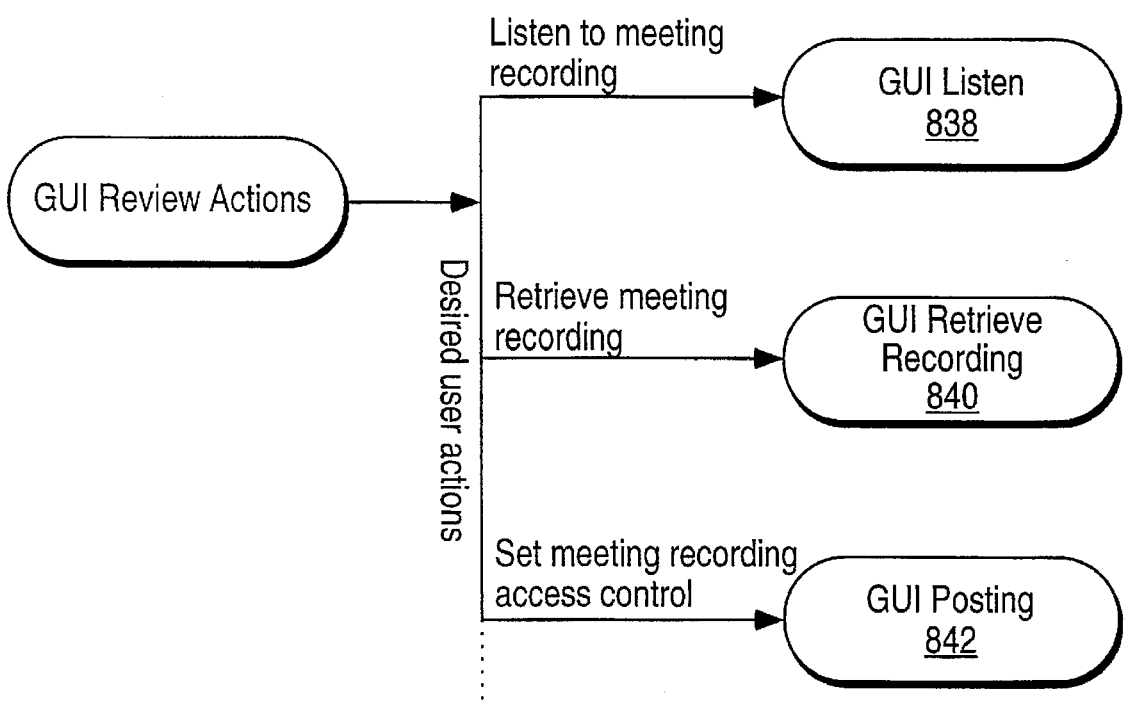
Figure 8D:
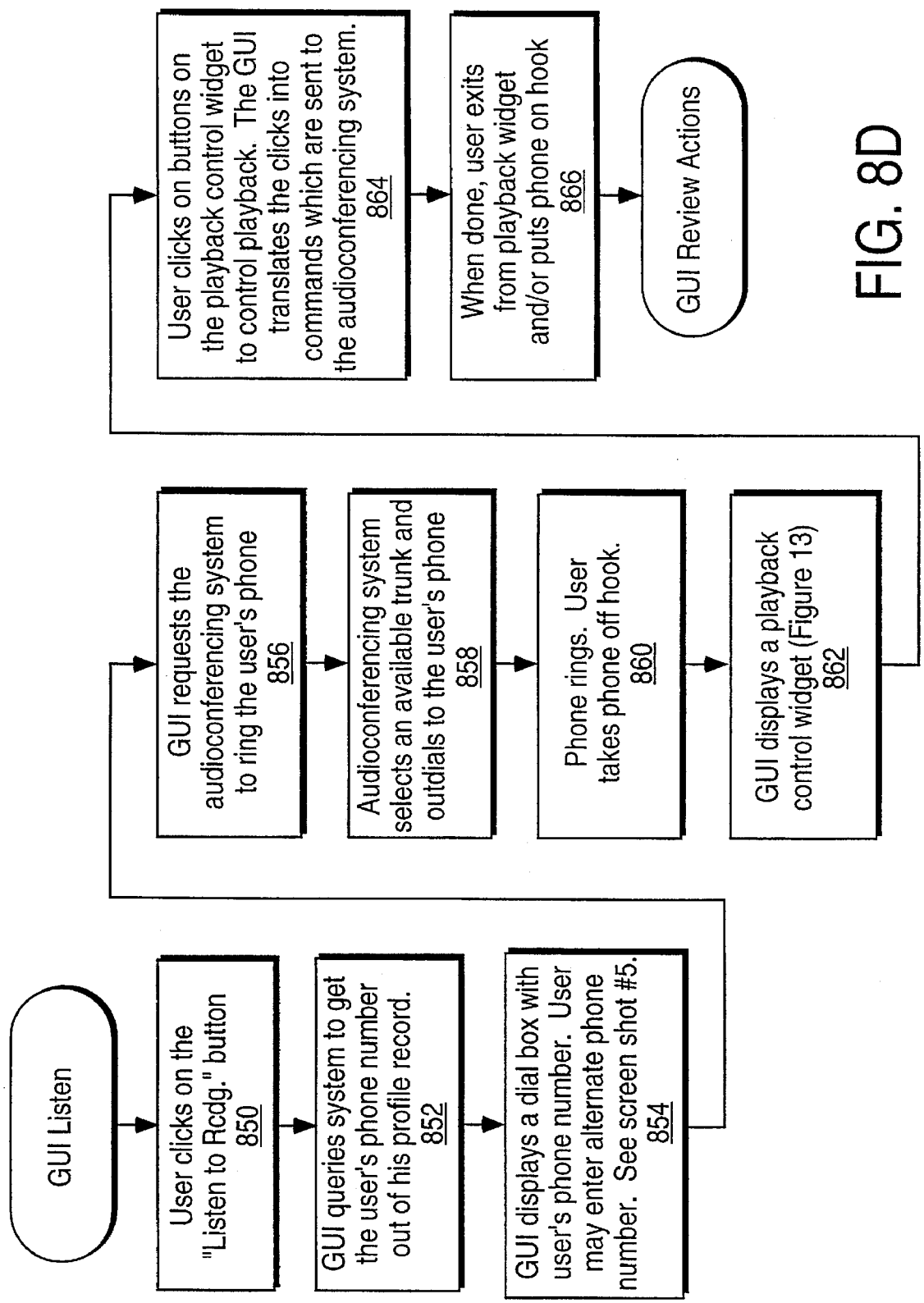
Figure 12:
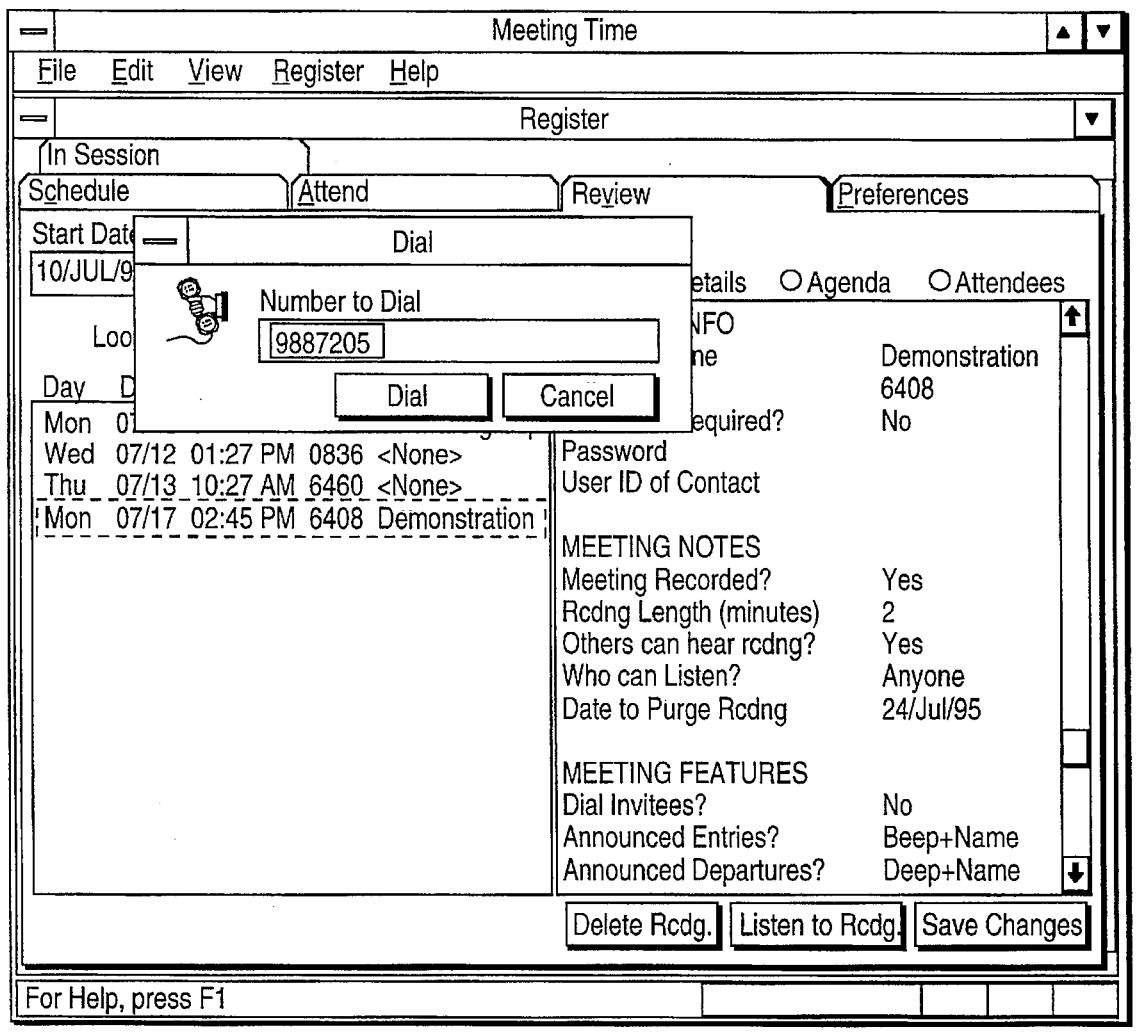
FIG. 12 is a screen display showing a dialog window for confirming the telephone number the system is to dial to connect a caller in one embodiment of the system of the present invention.
Figure 13:
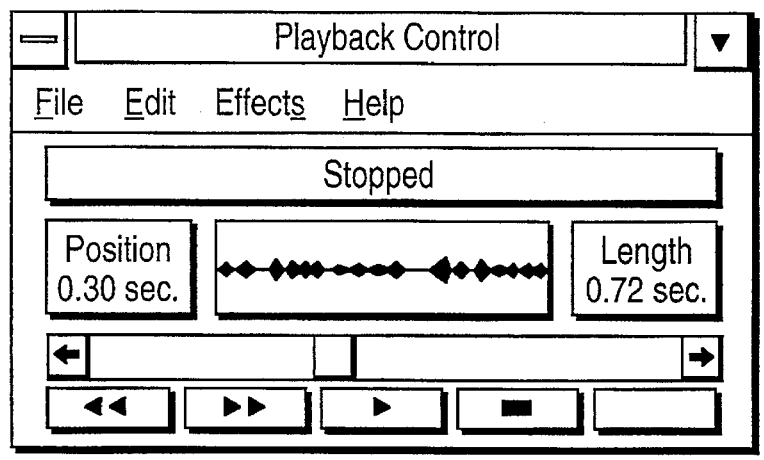
FIG. 13 is a screen display illustrating a playback control window in one embodiment of the system of the present invention.

Referring to FIG. 8c, the user can also listen to the recording, step 838, retrieve the recording, step 840, for storage locally on the user's computer, or post the recording, step 842, so that other users can listen to the recording. FIG. 8d sets forth steps for listening to a recording. In this embodiment, the user, step 850, clicks a button on the GUI to select the option. The system responds by retrieving the user's telephone number from the user's profile, step 852, and displays the telephone number to dial and communicate play back of the recording to, step 854, for confirmation by the user. An illustrative display screen is shown in FIG. 12. The user alternately can change the number, such that the system will dial up an alternate telephone. Thus, at step 856, the program operating on the server causes the telephony portion of the conferencing system to ring the user's phone identified by the phone number, steps 858, 860. The user answers the phone and play back of the recording is initiated. The system controller responds by communicating with the GUI program to display a dialogue box showing playback control, an example of which is shown in FIG. 13. The user can interact with this dialogue box to control the playback of the recording. The GUI translates the operations performed by the user into commands which are sent to the system controller to effect the playback of the recording, steps 862, 864. Once the user had completed reviewing the selected meeting, the user exits from the dialogue box and places his phone on hook to disconnect the telephone, step 866.

Figure 8E:
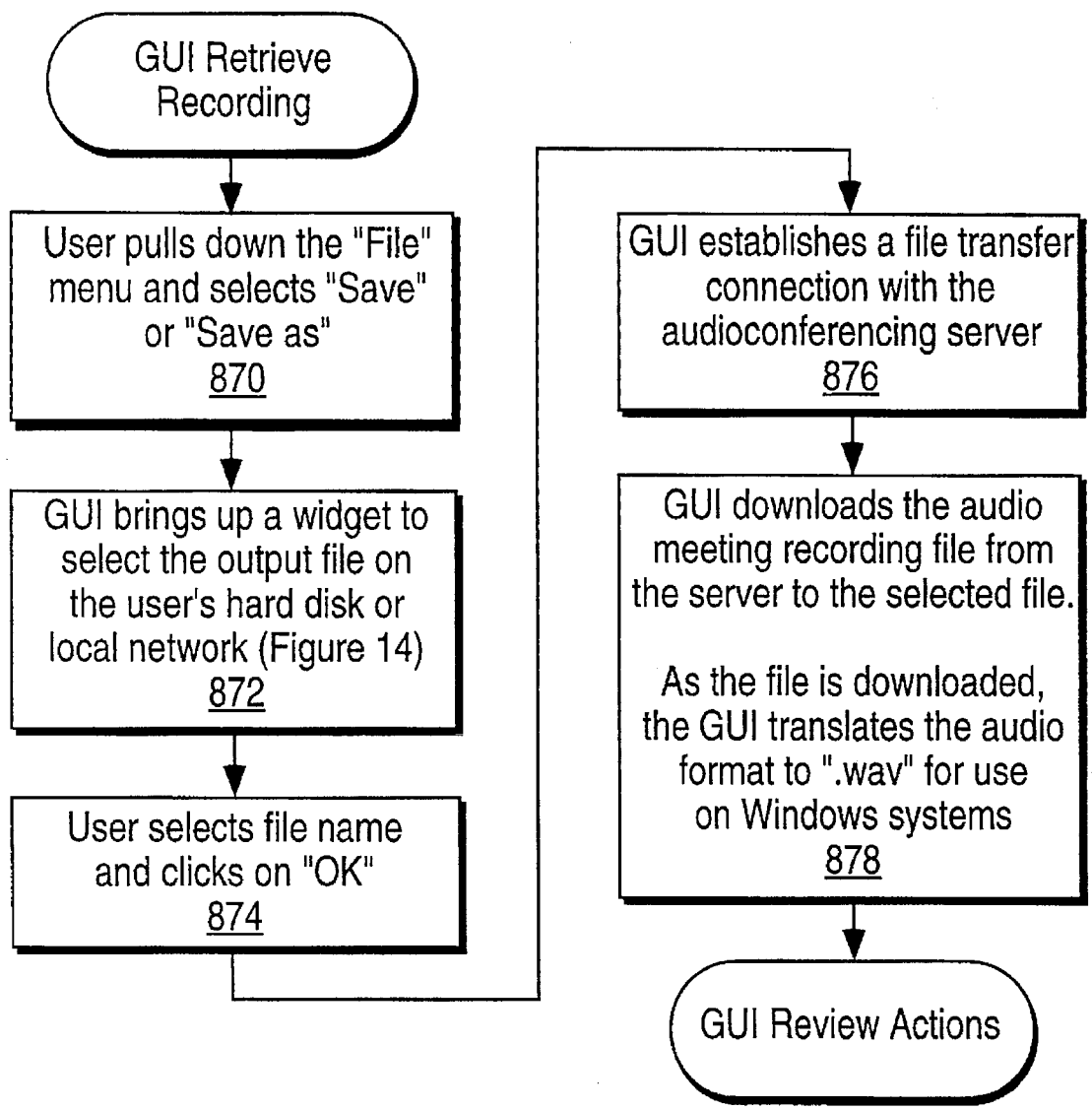
Figure 14:
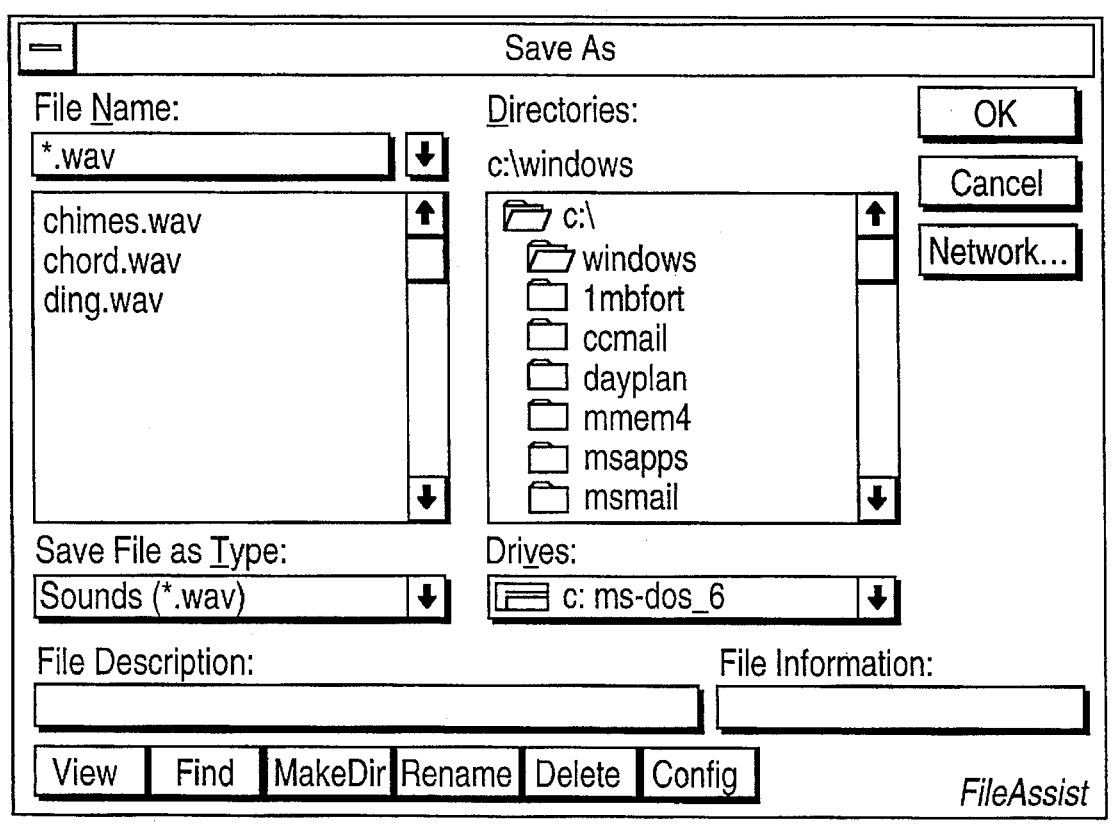
FIG. 14 is a screen display of a window illustrating the process of saving a recording as a file on the user's computer in one embodiment of the system of the present invention.

FIG. 8e describes the flow for retrieving a recording from the data storage subsystem for storing locally on the user's computer. The process is described in the context of a Microsoft Windows™ application environment. However, it is apparent that this process can performed in other computer environments, including other windowing environments (e.g., the Apple Macintosh environment). Thus, referring to FIG. 8e, at step 870, the user pulls down the menu option and selects the save menu option. As shown in FIG. 14, for example, the GUI program responds, step 872, by displaying a proper window for entering in a file name that the voice data is to be saved as. Thus, the user confirms the file name, step 874, and the GUI program responds by establishing a file transfer connection with the audio conference server, and downloading the audio data to the selected file. In the present embodiment, as the file is downloaded, the GUI translates the audio format to a format compatible with the Windows environment, steps 876, 878.

Figure 8F:
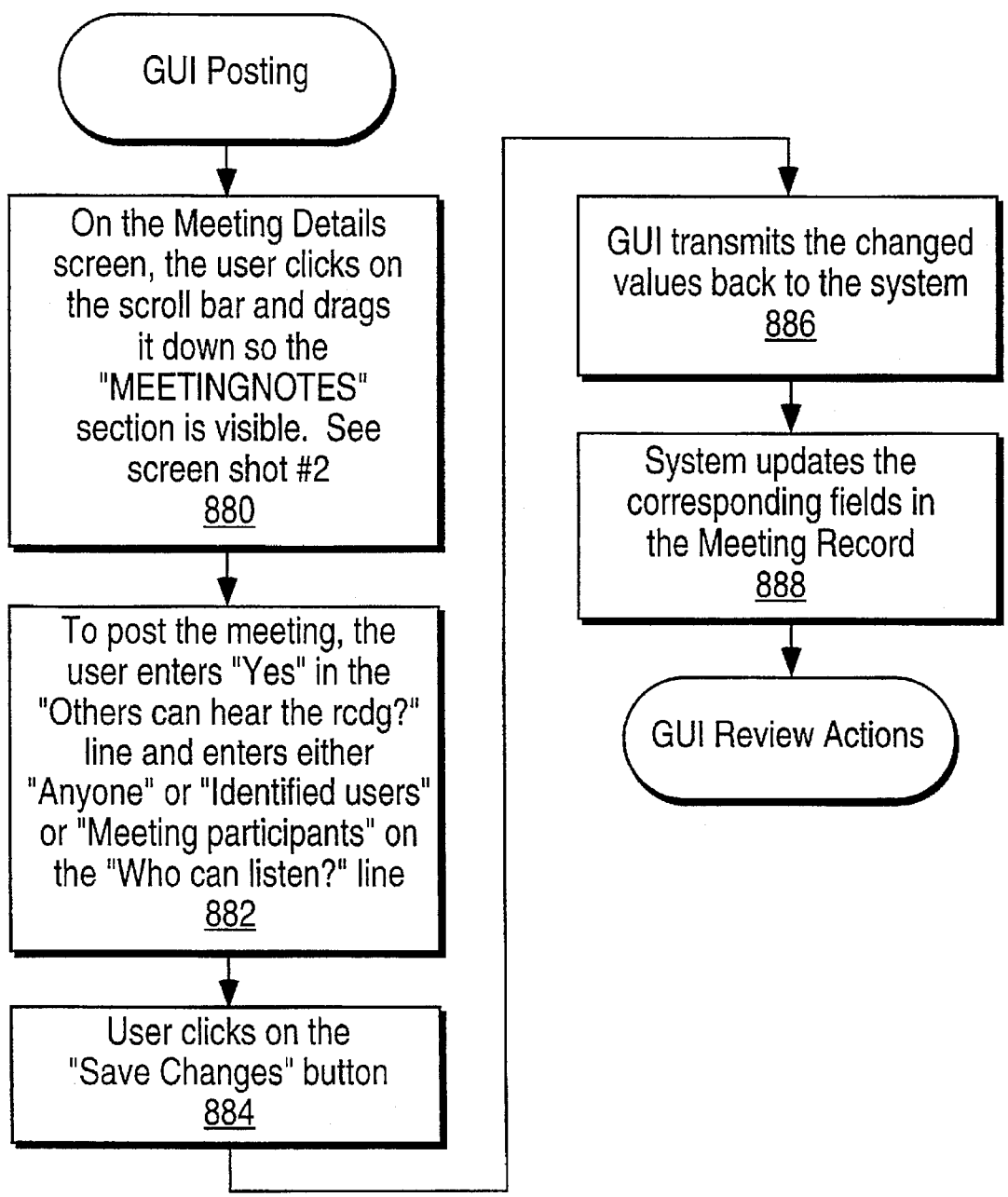

FIG. 8f illustrates the steps performed to set and modify posting options. The user, referring to FIG. 9b, when reviewing the meeting details, in particular, the "meeting notes" portion, selects "others can hear recording" 920 and modify the "who can listen" field to change parameters identifying who can listen to the recording. Once the parameters have been modified, and the modification saved, the GUI program transmits the modified values back to the server. The server responds by updating the corresponding fields of the meeting record, steps 880, 882, 884, 886, 888. Thus, a simple but effective mechanism is provided for recording and reviewing audio conferences.

The invention has been described in conjunction with the preferred embodiment. It is evident that numerous alternatives, modifications, variations and uses will be apparent to those skilled in the art in light of the foregoing description.

What is claimed is:

1. A method for recording an audio conference comprising the steps of:

prompting each conference participant to record a spoken name identifying the conference participant;

recording and storing in first audio data files in memory the spoken names of the conference participants, each first audio data file containing the spoken name of one conference participant;

capturing combined voice signals generated by conference participants during the conference and storing the captured combined voice signals in a conference data file in memory; and providing first data links between the first audio data files comprising the spoken name of each conference participant and the conference data file.

2. The method as set forth in claim 1, further comprising the step of playing back the recorded conference, said step comprising the steps of:

reading the conference data file from memory and generating audio for a user listening to the recording, said audio comprising the combined voice signals generated by the conference participants; and if a user enters a command to an input device, reading each first audio data file linked via the first data link to the conference data file and generating audio comprising the spoken names of each conference participant.

3. The method as set forth in claim 1, further comprising the step of providing a second data link between a second audio data file stored in memory with the conference data file, said second audio data file comprising a spoken name of the conference.

4. The method as set forth in claim 3, further comprising the step of playing back the recorded conference, said step comprising the steps of:

reading the conference data file from memory and generating audio for a user listening to the recording, said audio comprising the combined voice signals generated by the conference participants; and if a user enters a command to an input device, reading the second audio data file identified via the second data link and generating audio comprising the spoken name of the conference.

5. The method as set forth in claim 3, further comprising the steps of:

providing a user a listing of recorded conferences by reading a plurality of second audio data files, each second audio data file comprising the spoken name of a recorded conference, and generating an audio listing comprising the spoken names of recorded conferences;

said user selecting a recorded conference from the audio listing of recorded conferences;

reading the conference data file from memory and generating audio for a user listening to the recording, said audio comprising the combined voice signals generated by the conference participants.

6. The method as set forth in claim 5, wherein the step of the user selecting a conference comprises the step of the user entering at least one DTMF tone indicative of the selected conference using a user telephone keypad, said step of generating audio comprises generating audio through a handset of the user telephone.

7. The method as set forth in claim 5, wherein the step of providing the user a listing of recorded conferences comprises the step of providing a display of conference names on a user display device.

8. The method as set forth in claim 7, wherein the step of the user selecting a conference comprises the step of the user selecting a conference by entering at least one DTMF tone indicative of the selected conference using a user telephone keypad, said step of generating audio comprises generating audio through a handset of the user telephone.

9. The method as set forth in claim 7, wherein the step of the user selecting a conference comprises the step of the user selecting a conference by inputting a conference selection using an input device coupled to the user display device, said step of generating audio comprises generating audio through a handset of a user telephone.

10. The method as set forth in claim 7, wherein the user display device is a computer, the step of the user selecting a conference comprises the step of the user selecting a conference by inputting a conference selection using an input device of the computer, said step of generating audio comprises the steps of transmitting the audio data files to the computer and said computer generating the corresponding audio for the user.

11. The method as set forth in claim 3, further comprising the step of reading the second audio data file and generating audio comprising the spoken name of the conference to each conference participant when the conference participant enters the conference.

12. The method as set forth in claim 3, further comprising the step of reading the second audio data file and generating audio comprising the spoken name of the conference to each conference participant prior to the conference participant entering the conference.

13. The method as set forth in claim 1, further comprising the step of providing a second data link between a second audio data file and the conference data file, said second audio data file comprising a spoken agenda of the conference.

14. The method as set forth in claim 13, further comprising the step of play back of the recorded conference, said step comprising the steps of:

reading the conference data file from memory and generating audio for a user listening to the recording, said audio comprising the combined voice signals generated by the conference participants; and if a user enters a command to an input device, reading the second audio data file identified by the second data link and generating audio comprising the spoken agenda of the conference.

15. The method as set forth in claim 1, further comprising the steps of:

during the step of capturing combined voice signals, a conference participant entering a first command to indicate placement of a bookmark at a point in the conference data file;

upon entry of the first command, associating a marker with a location in the conference data file corresponding to the point in the conference data file;

performing a playback of the recorded conference, comprising the steps of;

reading the conference data file from memory and generating audio for a user listening to the recording, said audio comprising the combined voice signals generated by the conference participants; and if a user enters the first command to an input device, skipping to the location in the conference data file associated with the marker, and continuing the step of reading the conference data file from memory and generating audio for the user.

16. The method as set forth in claim 15, further comprising the steps of:

upon entry of the first command, prompting the conference participant who entered the first command to enter information to identify the bookmark; and wherein if the user enters the first command, providing the information to identify the bookmark to the user.

17. The method as set forth in claim 16, wherein the step of entering information to identify the bookmark comprises the steps of the conference participant speaking the information, capturing the voice signals of the conference participant speaking the information and storing the captured voice signal of the conference participant speaking the information in a second audio data file; and the step of providing the information comprises the step of reading the second audio data file and generating audio comprising the conference participant speaking the information.

18. The method as set forth in claim 15, wherein a plurality of bookmarks are generated, said user skipping in a forward direction and a reverse direction between locations of bookmarks upon entry of the first command and an indication of direction.

19. The method as set forth in claim 1, wherein the step of capturing combined voice signals comprises the step of selectively capturing combined voice data signals responsive to a second command entered by a conference participant during the step of capture, said second command causing the step of capturing to be switched between an on and off state.

20. The method as set forth in claim 19, wherein the second command is entered using DTMF keys on a phone set through which the conference participant is participating in the conference.

21. The method as set forth in claim 1, further comprising the step of providing a second data link between posting information stored in memory and the conference data file, said posting information identifying users that have access to play back the recorded conference.

22. The method as set forth in claim 21, wherein a conference is recorded by a user indicating that the conference is to be recorded, and only the user who selected the conference to be recorded is included in the posting information identifying the users that have access to play back the recorded conference.

23. The method as set forth in claim 21, wherein only users who are conference participants to the recorded conference have access to play back the recorded conference.

24. The method as set forth in claim 1, further comprising the step of providing a set of second data links between second audio data files and the conference data file, the second audio data files comprising entry announcements identifying conference participants entering the conference, each of said second data links providing a pointer between a location in the conference data file corresponding to combined voice signals recorded at a time a conference participant entered the conference.

25. The method as set forth in claim 1, further comprising the step of providing a set of second data links between second audio data files and the conference data file, the second audio data files comprising departure announcements identifying conference participants departing the conference, each of said second data links providing a pointer between a location in the conference data file corresponding to combined voice signals recorded at a time a conference participant departed the conference.

26. The method as set forth in claim 1, further comprising the steps of:

a user scheduling a time for the conference;

prompting the user to speak a conference announcement;

capturing the voice signal of the user speaking the conference announcement; and storing the captured voice signal in a second audio data file in memory;

wherein the conference announcement is played back to conference participants when each conference participant joins the conference.

27. The method as set forth in claim 26, wherein the conference announcement is selectively played back to conference participants currently joined in the conference.

28. The method as set forth in claim 1, further comprising the step of providing second data links between first audio data files and the conference data file, each of said second data links pointing to a location in the conference data file corresponding to a portion of time of the recorded combined voice signals, and first audio data files comprising the spoken name of each conference participant that spoke during the portion of time.

29. The method as set forth in claim 28, further comprising reading the conference data file from memory and generating audio for a user listening to the recording, said audio comprising the combined voice signals generated by the conference participants; and a user enters a first command to an input device during reading of a portion of the conference data file, reading each audio data file linked to a portion of the conference data file and generating audio comprising the spoken names of each conference participant speaking during the portion of the conference.

30. In an audio conferencing system, an apparatus comprising:

a data storage subsystem;

a computer processing system coupled to the data storage subsystem, said computer processing system configured to receive input voice signals generated by a plurality of conference participants during the conference and store the input voice signals in the data storage subsystem, said computer processing system further configured to store in the data storage subsystem and associate with the input voice signals stored in the data storage subsystem via data links an identification of conference participants of the conference recorded; and a user telephone coupled to said computer processing system, said user telephone enabling a user to input commands by entering DTMF tones using a keypad of the telephone, said computer processing system configured such that when the user enters a command to play back the conference, the computer processing system retrieves the input voice signals from the data storage subsystem and generates audio for play back of the conference through the user telephone and if the user enters a command to retrieve an identification of conference participants, the computer processing system, using the data links, retrieves the identification of conference participants and generates audio for playback of the identification of conference participants through the user telephone.

31. In an audio conferencing system, an apparatus comprising:

a data storage subsystem;

a computer processing system coupled to the data storage subsystem, said computer processing system configured to receive input voice signals generated by a plurality of conference participants during the conference and store the input voice signals in the data storage subsystem, said computer processing system further configured to store in the data storage subsystem and associate with the input voice signals stored in the data storage subsystem via data links an identification of conference participants of the conference recorded; and a user telephone coupled to the computer processing system, and a user computer coupled to the computer processing system, said user computer configured to enable said user to input commands using an input device of the user computer, said computer processing system configured such that when the user enters a command to play back the conference, the computer processing system retrieves the input voice signals from the data storage subsystem and generates audio for play back of the conference through the user telephone and if the user enters a command to retrieve an identification of conference participants, the user computer, using the data links, retrieves the identification of conference participants and generates audio for playback of the identification of conference participants through the user telephone.

32. In an audio conferencing system, an apparatus comprising:

a data storage subsystem;

a computer processing system coupled to the data storage subsystem, said computer processing system configured to receive input voice signals generated by a plurality of conference participants during the conference and store the input voice signals in the data storage subsystem, said computer processing system further configured to store in the data storage subsystem and associate with the input voice signals stored in the data storage subsystem via data links an identification of conference participants of the conference recorded; and a user computer coupled to the computer processing system, said user computer enabling a user to input commands using an input device of the user computer, wherein when the user enters a command to play back the conference, the computer processing system retrieves the input voice signals from the data storage subsystem and transfers the input voice signals to the user computer, said user computer generating audio for play back of the conference.

* * * * *